(12) United States Patent
Nakanishi

(10) Patent No.: US 10,627,645 B2
(45) Date of Patent: Apr. 21, 2020

(54) OPTICAL STRUCTURE

(71) Applicant: HAMAMATSU PHOTONICS K.K., Hamamatsu-shi, Shizuoka (JP)

(72) Inventor: Atsushi Nakanishi, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 311 days.

(21) Appl. No.: 15/837,156

(22) Filed: Dec. 11, 2017

(65) Prior Publication Data
US 2018/0164601 A1   Jun. 14, 2018

(30) Foreign Application Priority Data

Dec. 13, 2016 (JP) ................. 2016-241357

(51) Int. Cl.
| | |
|---|---|
| *G02B 27/28* | (2006.01) |
| *G02B 5/30* | (2006.01) |
| *G02B 5/04* | (2006.01) |
| *G02B 27/09* | (2006.01) |
| *G02B 27/30* | (2006.01) |
| *G02B 27/00* | (2006.01) |

(52) U.S. Cl.
CPC ............. *G02B 27/283* (2013.01); *G02B 5/04* (2013.01); *G02B 5/30* (2013.01); *G02B 5/3083* (2013.01); *G02B 27/00* (2013.01); *G02B 27/09* (2013.01); *G02B 27/28* (2013.01); *G02B 27/30* (2013.01)

(58) Field of Classification Search
CPC .......... G02B 27/283; G02B 5/04; G02B 5/30; G02B 5/3083; G02B 27/00; G02B 27/09; G02B 27/28; G02B 27/30
See application file for complete search history.

(56) References Cited

PUBLICATIONS

Mu et. al., "Achromatic Savart polariscope: choice of materials", Optics Express, vol. 22, pp. 5043-5051 (2014). (Year: 2014).*
Gerald Wong et al., "Achromatization of Wollaston polarizing beam splitters," Optics Letters, Apr. 15, 2011, pp. 1332-1334, vol. 36, No. 8.

* cited by examiner

*Primary Examiner* — Wen Huang
(74) *Attorney, Agent, or Firm* — Faegre Drinker Biddle & Reath LLP

(57) ABSTRACT

Provided is an optical structure in which an alignment compensator is disposed at a rear stage of a polarizing beam splitter, and when a first input light having a first wavelength (λ1) is input to the polarizing beam splitter and when a second input light having a second wavelength (λ2) is input to the polarizing beam splitter, the alignment compensator is set such that, on a light outgoing plane of the alignment compensator, a traveling direction and an outgoing position of ordinary light of the first input light and a traveling direction and an outgoing position of ordinary light of the second input light coincide with each other, and a traveling directions and an outgoing position of extraordinary light of the first input light and a traveling direction and an outgoing position of extraordinary light of the second input light coincide with each other.

5 Claims, 16 Drawing Sheets

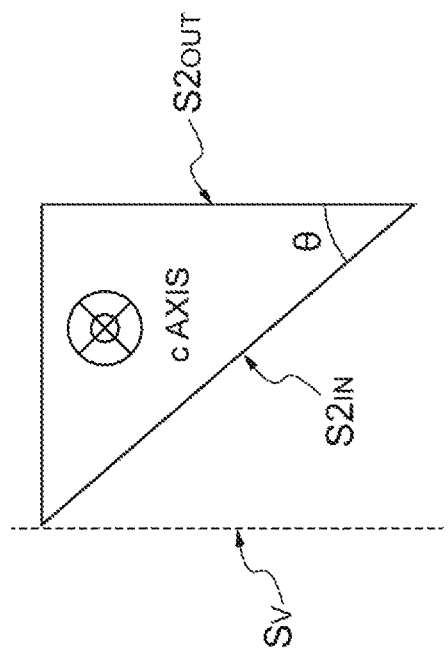
*Fig.5A*
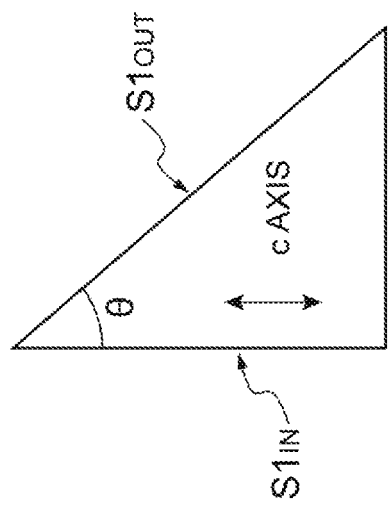
*Fig.5B*
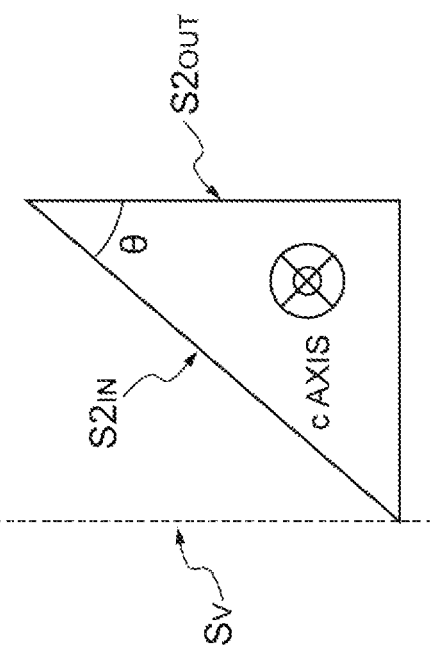
*Fig.5C*
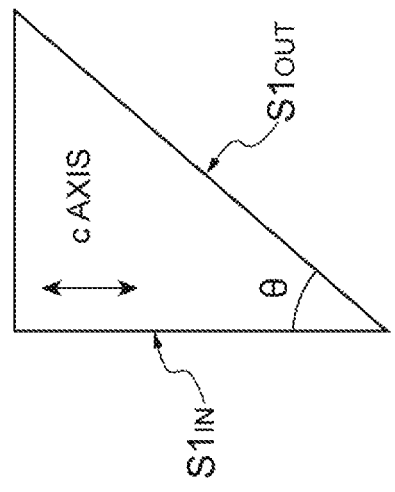
*Fig.5D*
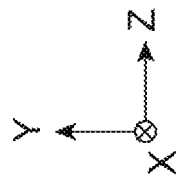

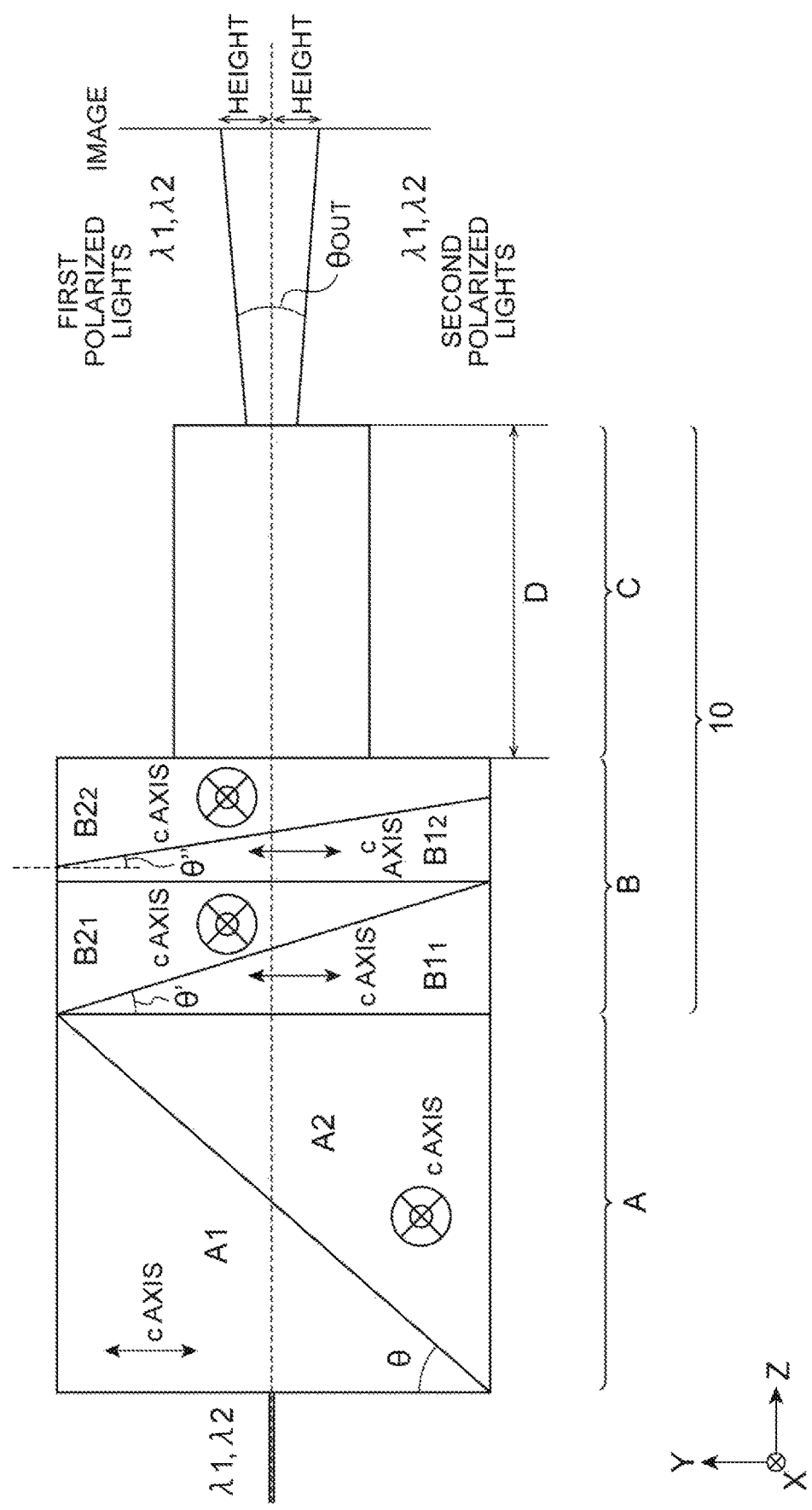

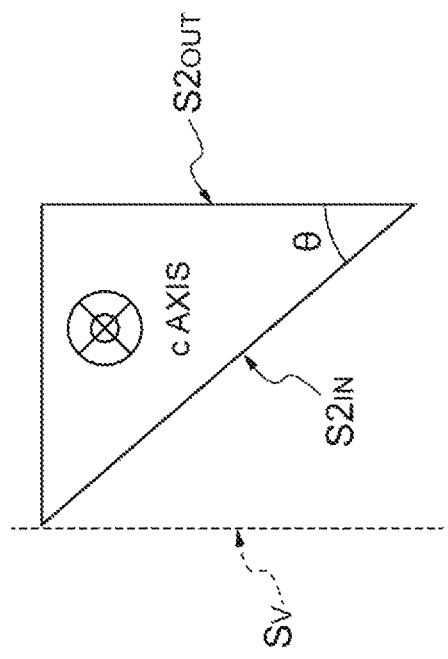
Fig.11X
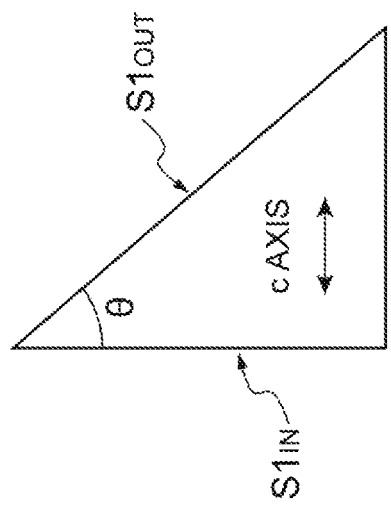
Fig.11B
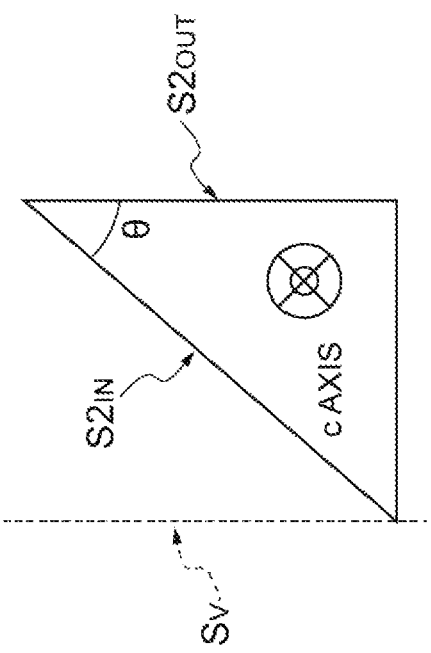
Fig.11Y
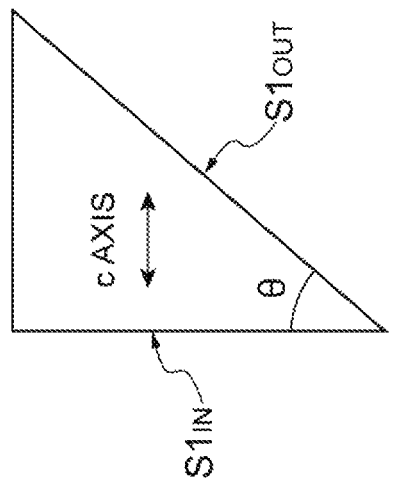
Fig.11D
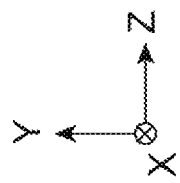

Fig.14

| | WAVELENGTH(nm) | SPLIT ANGLE θ$_{OUT}$(°) | FIRST POLARIZED LIGHT IRRADIATION POSITION Y(mm) | SECOND POLARIZED LIGHT IRRADIATION POSITION Y(mm) |
|---|---|---|---|---|
| EXAMPLE | 500 | 0.369 | 0.299 | −0.298 |
| | 600 | 0.361 | 0.294 | −0.293 |
| | 700 | 0.356 | 0.290 | −0.289 |
| | 300 × 10³ (1.00THz) | 0.357 | 0.316 | −0.310 |
| | 180 × 10³ (1.67THz) | 0.343 | 0.303 | −0.296 |
| | 125 × 10³ (2.40THz) | 0.360 | 0.305 | −0.298 |
| COMPARATIVE EXAMPLE | 500 | 0.369 | 0.412 | −0.411 |
| | 600 | 0.361 | 0.403 | −0.402 |
| | 700 | 0.356 | 0.398 | −0.397 |
| | 300 × 10³ (1.00THz) | 0.357 | 0.496 | −0.483 |
| | 180 × 10³ (1.67THz) | 0.343 | 0.475 | −0.463 |
| | 125 × 10³ (2.40THz) | 0.361 | 0.486 | −0.474 |

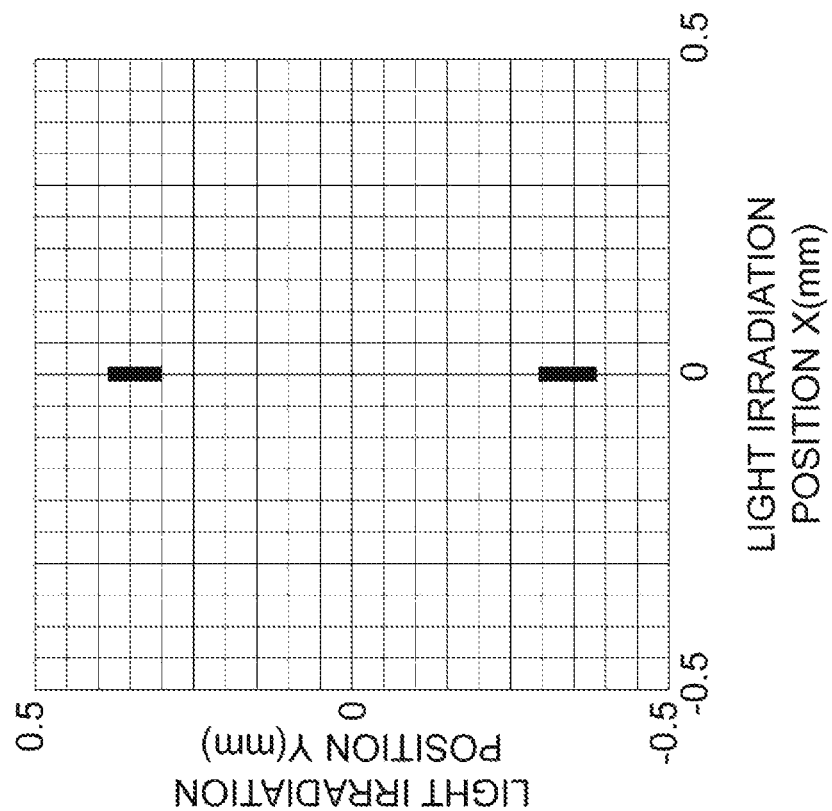
Fig.15A EXAMPLE
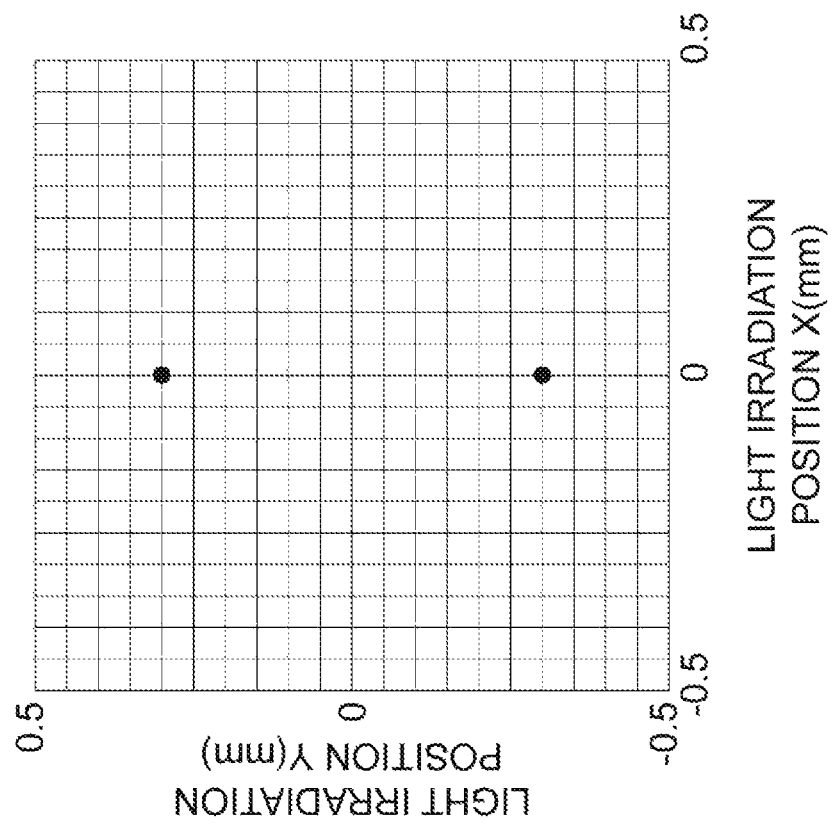
Fig.15B COMPARATIVE EXAMPLE

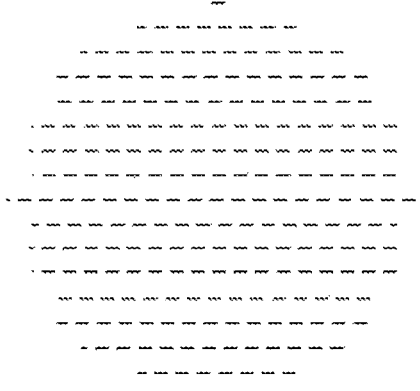
Fig.16B
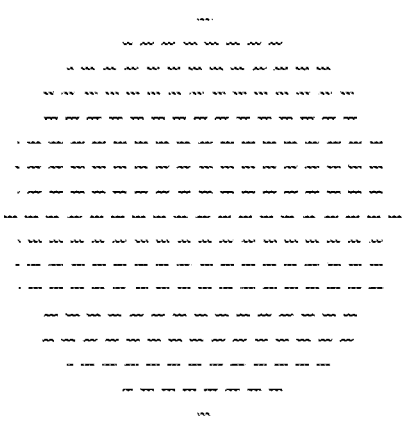
Fig.16D
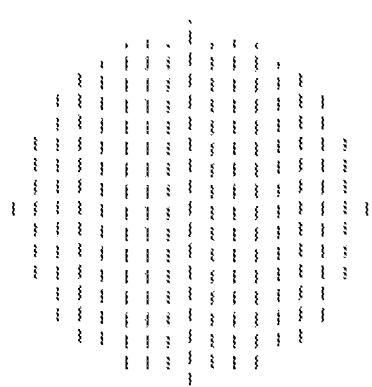
Fig.16A
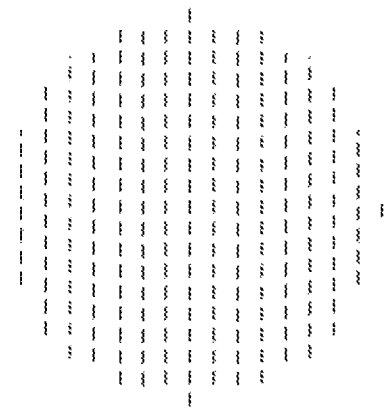
Fig.16C
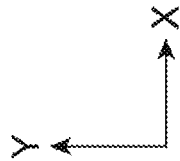

OPTICAL STRUCTURE

TECHNICAL FIELD

The present invention relates to an optical structure capable of monitoring a position of invisible light.

BACKGROUND

In recent years, image capturing using terahertz waves has been anticipated in fields such as security inspection, biotechnology, and the like. In these fields, polarized imaging for splitting terahertz waves into ordinary light (rays) and extraordinary light (rays) to perform image capturing is considered to be especially useful.

Meanwhile, terahertz waves are invisible light, and thus positions of the light cannot be accurately determined. When an attempt is made to discriminate the positions of the light, a method of inputting guide light to be monitored on the same axis as the invisible light is considered. However, since wavelengths of the light differ, behaviors inside an optical structure differ, and accurate monitoring is impossible.

As a method of monitoring a position of light, a method of using an optical structure as described in Non-Patent Literature 1 is considered. In Non-Patent Literature 1, a Wollaston prism is coupled to another Wollaston prism at a rear stage thereof. In the same literature, there is a proposal for an optical structure in which different wavelengths of light are output at the same split angle in spite of being polarized and split.

[Non-Patent Literature 1] Gerald Wong, Roger Pilkington, and Andrew R. Harvey, "Achromatization of Wollaston polarizing beam splitters," Optics Letters 36, 8 1332-1334 (2011)

SUMMARY

However, according to the conventional method, the split angles of the input light having different wavelengths can coincide with each other. However, outgoing positions of the light are shifted, and more accurate monitoring of positions of light is required.

The present invention was made in view of these problems, and an object thereof is to provide an optical structure capable of accurately monitoring a position of invisible light.

To solve the above problems, a first optical structure includes: a polarizing beam splitter which splits input light input from an incoming plane thereof into first polarized light and second polarized light and in which a split angle, which is an angle formed by traveling directions of the first polarized light and the second polarized light, is an acute angle; and an alignment compensator which is disposed at a rear stage of the polarizing beam splitter and outputs the input first polarized light and the input second polarized light from a light outgoing plane thereof. When first input light having a first wavelength ($\lambda 1$) is input to the polarizing beam splitter, and when second input light having a second wavelength ($\lambda 2$) is input to the polarizing beam splitter, the alignment compensator causes each of traveling directions and outgoing positions of the first polarized light of the first input light and the first polarized light of the second input light to coincide with each other on the light outgoing plane of the alignment compensator, and causes each of traveling directions and outgoing positions of the second polarized light of the first input light and the second polarized light of the second input light to coincide with each other on the light outgoing plane of the alignment compensator.

From the practical viewpoint of polarized imaging, coincidence of the split angles can include an error of 0.026° on a light outgoing plane of an alignment compensator of a final stage, the coincidence of the outgoing positions of the first polarized light can include an error of 0.026 mm on a plane (referred to as a reference image plane) that is separated 20 mm from the light outgoing plane of the alignment compensator of the final stage in a direction of the Z axis, and the coincidence of the outgoing positions of the second polarized light can include an error of 0.021 mm on the reference image plane that is separated 20 mm from the light outgoing plane of the alignment compensator of the final stage in the direction of the Z axis.

The polarizing beam splitter splits the first and second polarized light at an acute angle. Thereby, positional correction based on the alignment compensator of the rear stage is facilitated. The alignment compensator is optical path correcting means using the fact that different wavelengths pass other traveling paths. When light of different wavelengths is input at different positions in different traveling directions, the alignment compensator causes outgoing positions and traveling directions to coincide with each other on the light outgoing plane thereof. If one of the wavelengths is set for invisible light, and the other wavelength located at a band that is discontinuous to the one wavelength is set for visible light, the invisible light and the visible light which are input to the polarizing beam splitter on the same axis appear at the same position on the light outgoing plane of the alignment compensator, and are adapted to travel in the same direction. Therefore, the position of the visible light is monitored, and thereby the position of the invisible light can be accurately monitored.

In a second optical structure, the alignment compensator includes: a split angle compensator; and an outgoing position compensator. The split angle compensator satisfies $\theta 2 - \theta 1 > \theta 2' - \theta 1'$ when the split angle for the first input light input to the polarizing beam splitter is set to $\theta 1$, when the split angle for the second input light input to the polarizing beam splitter is set to $\theta 2$, when the split angle in the split angle compensator for the first and second polarized light originating from the first input light and input to the split angle compensator is set to $\theta 1'$, when the split angle in the split angle compensator for the first and second polarized light originating from the second input light and input to the split angle compensator is set to $\theta 2'$, when $\lambda 1 > \lambda 2$, and when $\theta 1 > \theta 2$. A light outgoing plane of the split angle compensator has a refractive index ($n_{B1P}$) for the first polarized light of the first wavelength ($\lambda 1$), a refractive index ($n_{B1S}$) for the second polarized light of the first wavelength ($\lambda 1$), a refractive index ($n_{B2P}$) for the first polarized light of the second wavelength ($\lambda 2$), and a refractive index ($n_{B2S}$) for the second polarized light of the second wavelength ($\lambda 2$). When a separation distance between the first polarized light and the second polarized light originating from the first input light on the light outgoing plane of the split angle compensator is set to L1, and a separation distance between the first polarized light and the second polarized light originating from the second input light on the light outgoing plane of the split angle compensator is set to L2, the outgoing position compensator has a refractive index ($n_{C1}$) at the first wavelength ($\lambda 1$), a refractive index ($n_{C2}$) at the second wavelength ($\lambda 2$), and a thickness (D). The refractive index ($n_{B1S}$), the refractive index ($n_{B1P}$), the refractive index ($n_{B2S}$), the refractive index ($n_{B2P}$), the separation distance (L1), the separation distance (L2), the refractive index ($n_{C1}$), the refractive index ($n_{C2}$), and the thickness (D) satisfy relational formulae below:

$$L1-L2=(D\cdot\tan\theta_{C21}-D\cdot\tan\theta_{C11})+(D\cdot\tan\theta_{C22}-D\cdot\tan\theta_{C12})$$

$\theta_{C11}$, $\theta_{C21}$, $\theta_{C22}$, and $\theta_{C12}$ satisfy the following formulae.

$$\theta_{C11}=\sin^{-1}((n_{B1P}\cdot\sin\theta_{B11})/n_{C1})$$

$$\theta_{C21}=\sin^{-1}((n_{B2P}\cdot\sin\theta_{B21})/n_{C2})$$

$$\theta_{C22}=\sin^{-1}((n_{B2S}\cdot\sin\theta_{B22})/n_{C2}), \text{ and}$$

$$\theta_{C12}=\sin^{-1}((n_{B1S}\cdot\sin\theta_{B12})/n_{C1})$$

The alignment compensator causes the traveling directions and the outgoing positions of the first and second polarized light of the different wavelengths output from the front polarizing beam splitter to coincide with each other. As the structure of the alignment compensator, as prescribed above, a structure in which the split angles of the different wavelengths are first approximated by the split angle compensator, and at the rear stage of the split angle compensator, the outgoing positions are caused to coincide with each other by the outgoing position compensator having an isotropic refractive index distribution may be used. In the case of this structure, since the parameters can be independently controlled, there is an advantage in that design is facilitated.

In a third optical structure, each of the polarizing beam splitter and the split angle compensator is formed of a Wollaston prism.

In the case of this structure, since the Wollaston prism can be easily obtained on the market, there is an advantage in that assembly is facilitated.

In a fourth optical structure, the polarizing beam splitter is made up of a first Wollaston prism obtained by attaching two trigonal crystal blocks such that c axes are orthogonal to each other; the split angle compensator is made up of a second Wollaston prism obtained by sticking two trigonal crystal blocks such that c axes are orthogonal to each other and a third Wollaston prism that is disposed at a rear stage of the second Wollaston prism and is obtained by attaching two tetragonal crystal blocks such that c axes are orthogonal to each other; and the c axes of the first, second, and third Wollaston prisms are all orthogonal to the traveling direction of the input light into the polarizing beam splitter.

In a fifth optical structure, each of the polarizing beam splitter and the split angle compensator is formed of a Rochon prism. Since the Rochon prism can be easily obtained on the market, there is an advantage in that assembly is facilitated.

In a sixth optical structure, the trigonal crystal block is formed of quartz or sapphire, and the tetragonal crystal block is formed of $MgF_2$. Since these materials can be easily obtained on the market, there is an advantage in that assembly is facilitated. In addition, there is an advantage in that absorption of terahertz waves is little.

According to the optical structure of the present invention, a position of invisible light can be accurately monitored.

BRIEF DESCRIPTION OF THE DRAWINGS

FIGS. 5A, 5B, 5C, and 5D are diagrams illustrating various blocks constituting a prism.

FIG. 6 is a diagram illustrating an optical structure according to an embodiment.

FIGS. 11X, 11Y, 11B, and 11D are diagrams illustrating each block constituting the prism.

FIG. 14 is a chart illustrating split angles at wavelengths and light irradiation positions on an image plane in examples and comparative examples.

FIGS. 15A and 15B are graphs illustrating light irradiation positions on the image plane in the examples and the comparative examples.

FIGS. 16A, 16B, 16C, and 16D are diagrams for describing orientation of polarization.

DETAILED DESCRIPTION

Hereinafter, an optical structure according to an embodiment will be described. Identical or equivalent elements are given the same reference signs, and duplicate description thereof will be omitted.

Figure 1:
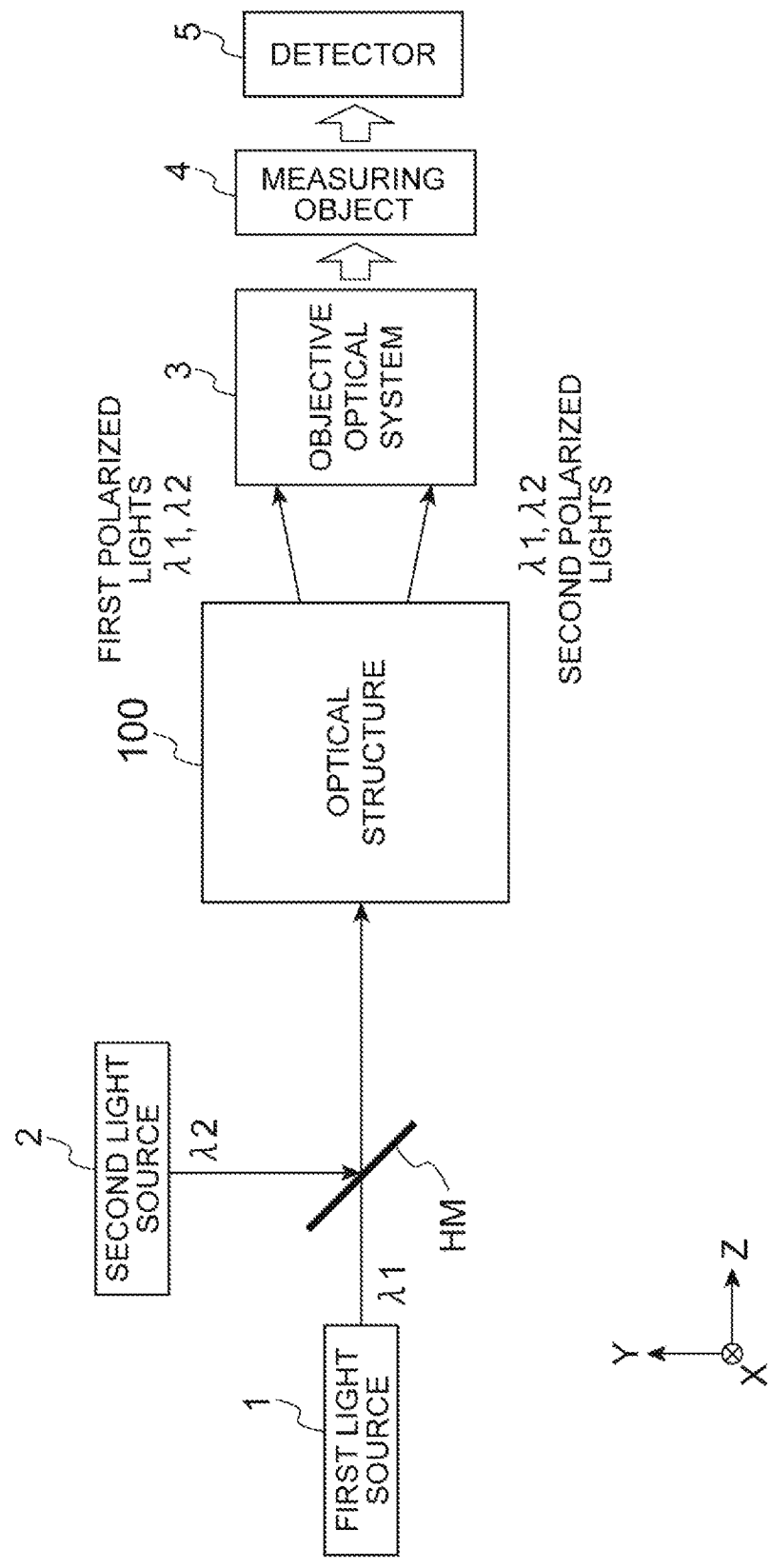
FIG. 1 is a diagram illustrating a detecting device using an optical structure.

FIG. 1 is a diagram illustrating a detecting device using an optical structure.

This detecting device includes a first light source 1 that emits a terahertz wave of a first wavelength λ1 (first input light) used for inspection, a second light source 2 that emits monitoring light of a second wavelength λ2 (second input light) such as visible light, and an optical structure 100 that splits the input light input from each light source into first polarized light and second polarized light in which directions of vibration of electric fields are orthogonal to each other and emits the split light. The terahertz wave of the first wavelength λ1 and the monitoring light of the second wavelength λ2 that are output from the light sources are coaxially propagated by interposing a half mirror HM, and are incident on the optical structure 100. A direction of the propagation is defined as a direction of a Z axis, a direction perpendicular to the Z axis is defined as an X axis, and a direction perpendicular to both of the Z axis and the X axis is defined as a Y axis. The XYZ axes constitute a three-dimensional orthogonal coordinate system.

The terahertz wave split into the first and second polarized light by the optical structure 100 is applied to a measuring object 4 via an objective optical system 3 made up of an objective, a collimator lens, and so on. The measuring object 4 may include various objects, for instance, a biological sample, an object capable of transmitting terahertz waves with a distribution of different refractive indexes in the terahertz wave band, a partially hollow object, and so on.

For example, an object in which a contrast is not easily imparted to a terahertz wave image such as a plastic in which a part of constituent materials thereof is degraded (subjected to a change in refractive index) is considered to be used as the measuring object. The terahertz wave passing through the measuring object 4 is detected by a detector 5. When incident on the measuring object 4, the terahertz wave is split into the first and second polarized light having orientations of polarization perpendicular to each other, and thus information about the measuring object 4 can be obtained from a phase difference when these pass through the measuring object 4. If the detector 5 is sensitive to the first wavelength λ1 and the second wavelength λ2, a solid-state imaging device such as a CCD or a MOS image sensor, a photomultiplier tube, a bolometer, a pyrodetector, a plasma wave base detector, a Schottky barrier diode, a superconductive detector, etc. may be used as the detector 5 in addition to a photodetector such as a photodiode.

The optical structure 100 splits the input light into the first polarized light and the second polarized light. A polarizing beam splitter is installed in the optical structure 100, and the polarized lights become ordinary light and extraordinary light when separated. The ordinary light and the extraordinary light are light having the orientations of polarization that are orthogonal to each other (the directions of vibration of electric fields are orthogonal to each other) when the light travels into a birefringent crystal. In a case in which the birefringent crystal is considered as an indicatrix, if an axis having the same refractive index distribution in a traveling direction is defined as an optic axis, the ordinary light is light that vibrates in a direction perpendicular to the optic axis, and the extraordinary light is light that vibrates in a direction perpendicular to the ordinary light. The optical structure 100 includes a polarizing splitter such as a polarizing beam splitter at an initial stage. When output by the polarizing splitter, the ordinary light is set as the first polarized light, and the extraordinary light is set as the second polarized light.

Hereinafter, the optical structure 100 will be described, but an optical structure 100 of a comparative example will be described first.

Figure 2:
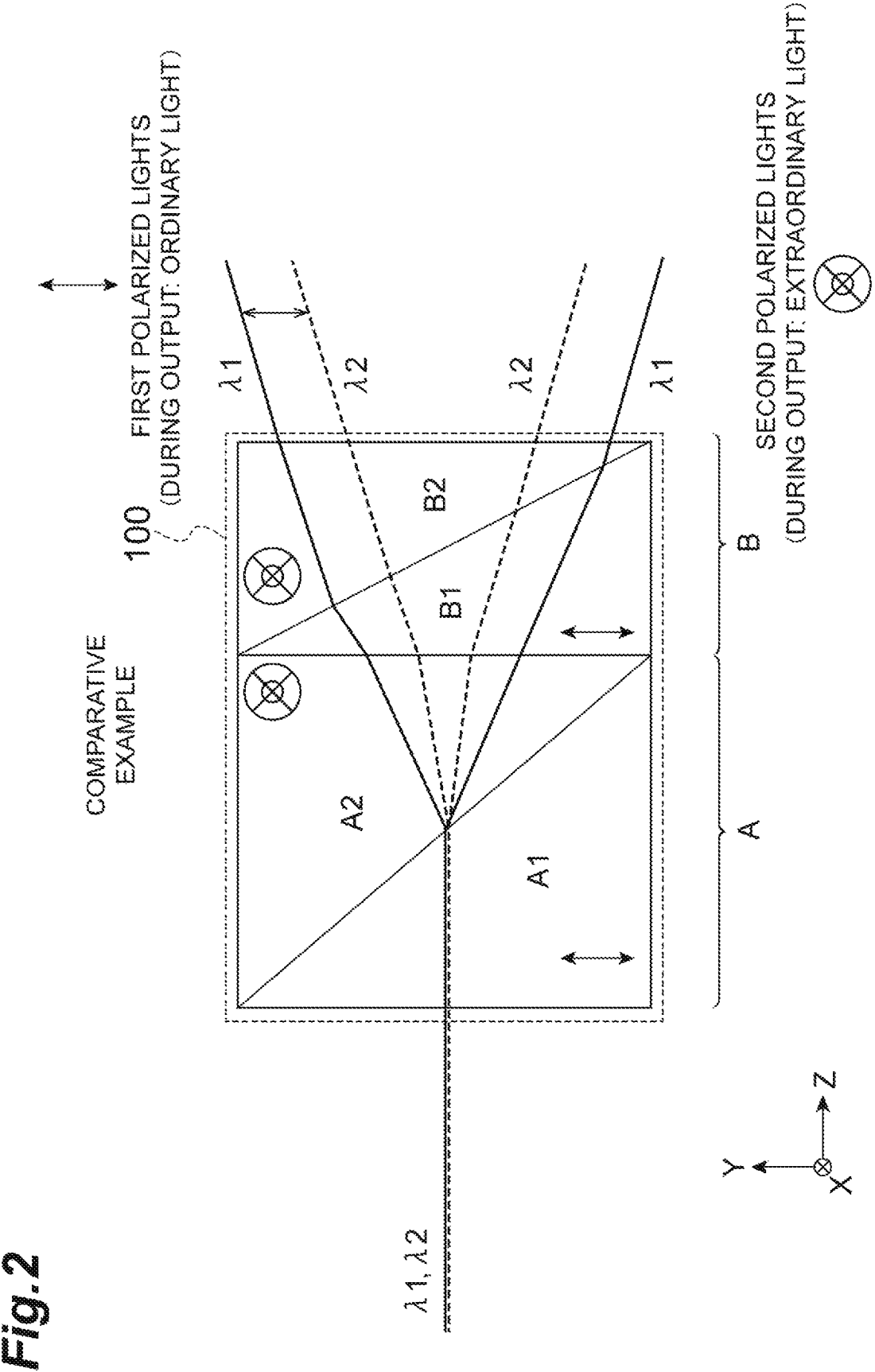
FIG. 2 is a diagram illustrating an optical structure according to a comparative example.

FIG. 2 is a diagram illustrating an optical structure according to a comparative example.

This optical structure 100 includes a polarizing beam splitter A and a split angle compensator B. When light having different wavelengths (a first wavelength λ1 and a second wavelength λ2) is incident on a light incoming plane of the polarizing beam splitter A, the light is split into first polarized light and second polarized light, and is incident on the split angle compensator B. The split angle compensator B causes traveling directions of the light having different wavelengths to coincide with each other, and emits the first polarized light (the ordinary light) and the second polarized light (the extraordinary light) from a light outgoing plane at each of wavelengths thereof.

The polarizing beam splitter A is a Wollaston prism, and has a function of splitting incident light into the ordinary light and the extraordinary light. The split angle compensator B is also the Wollaston prism, and when an inclined angle of a block junction plane, refractive indexes, and a thickness constituting the prism are appropriately adjusted, the traveling directions of the light having different wavelengths (the first wavelength λ1 and the second wavelength λ2) can coincide with each other. However, the outgoing positions of the light are shifted, and further accurate positions of the light cannot be monitored.

Figure 3:
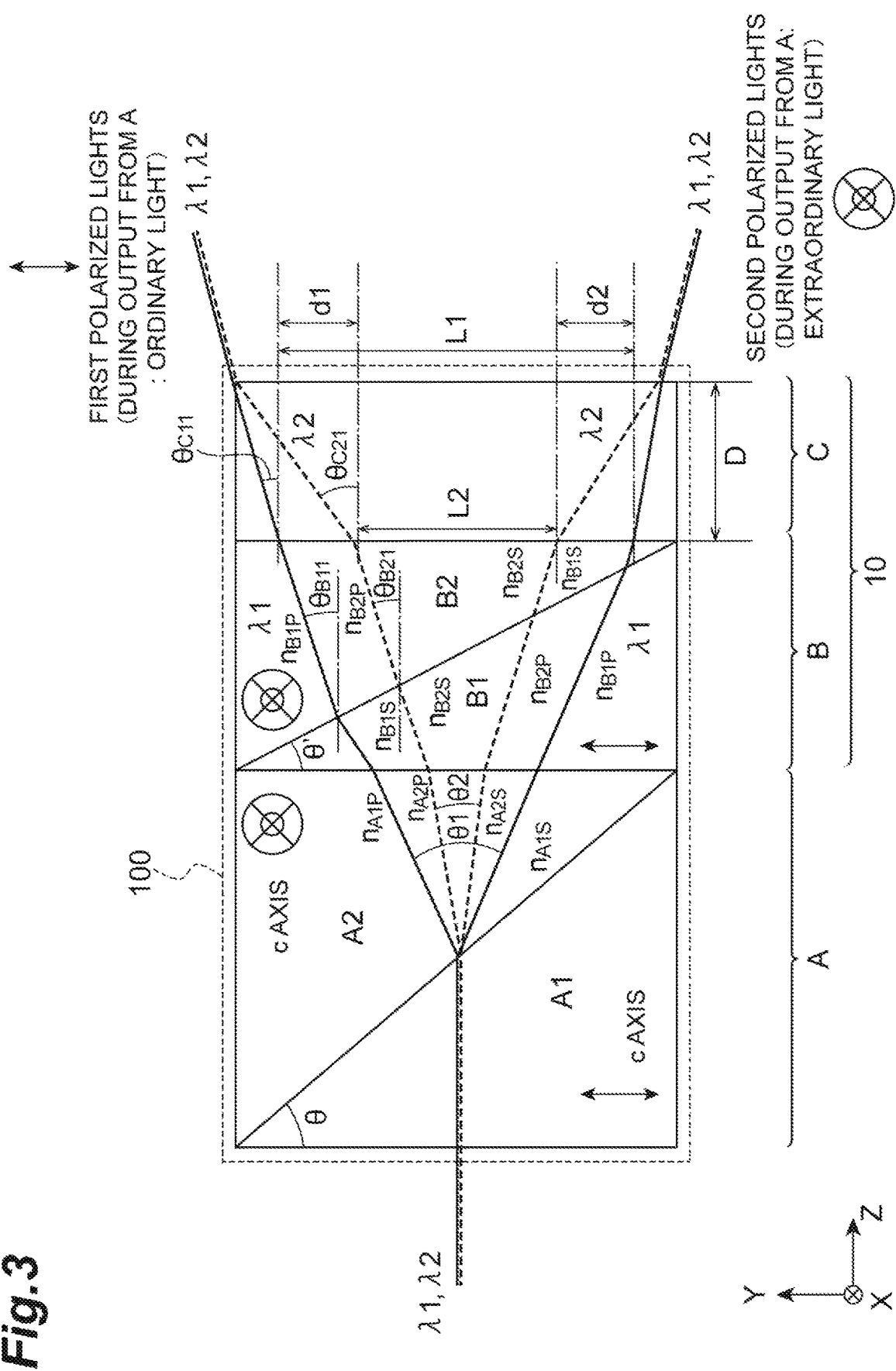
FIG. 3 is a diagram illustrating an optical structure according to an embodiment.

FIG. 3 is a diagram illustrating the optical structure 100 according to an embodiment.

In the optical structure 100 according to the embodiment, the polarizing beam splitter A includes a alignment compensator 10. The alignment compensator 10 further includes an outgoing position compensator C in addition to the split angle compensator B.

The polarizing beam splitter A splits the input light input from the incoming plane into the first polarized light (the ordinary light when output from the polarizing beam splitter) and the second polarized light (the extraordinary light when output from the polarizing beam splitter). Split angles (a first split angle θ1 of the first wavelength λ1 and a second split angle θ2 of the second wavelength λ2) that are angles formed by the first polarized light and the second polarized light in the traveling directions are acute angles.

The alignment compensator 10 is disposed at a rear stage, and outputs the first polarized light and the second polarized light, which are input from the polarizing beam splitter A, from the light outgoing plane.

When the first input light having the first wavelength λ1 is input to the polarizing beam splitter A, and when the second input light having the second wavelength λ2 is input to the polarizing beam splitter A, the alignment compensator 10 has parameters of constituents set such that the traveling directions and outgoing positions of the first polarized light of the first input light (of the first wavelength λ1) and the first polarized light of the second input light (of the second wavelength λ2) coincide with each other on the light outgoing plane and the traveling directions and outgoing positions of the second polarized light of the first input light (of the first wavelength λ1) and the second polarized light of the second input light (of the second wavelength λ2) coincide with each other on the light outgoing plane.

A coincidence of the split angles (the split angle $F\theta1=\theta_{C11}+\theta_{C12}$ in the case of the first wavelength and the split angle $F\theta2=\theta_{C21}+\theta_{C22}$ in the case of the second wavelength (see FIG. 4)) of the two wavelengths can include an error $\Delta\theta$ (=$F\theta2-F\theta1$) of 0.026° on the light outgoing plane of the alignment compensator 10 of a final stage.

The coincidence of the outgoing positions of the first polarized light of the first input light and the first polarized light of the second input light can include an error of 0.026 mm on a plane (defined as a reference image plane) that is spaced 20 mm apart from the light outgoing plane of the alignment compensator 10 of the final stage in a direction of the Z axis, and the coincidence of the outgoing positions of the second polarized light of the first input light and the second polarized light of the second input light can include an error of 0.021 mm on the reference image plane that is spaced 20 mm apart from the light outgoing plane of the alignment compensator of the final stage in the direction of the Z axis.

First, a structure of the polarizing beam splitter A will be further described.

The polarizing beam splitter A of this example is a Wollaston prism, and splits the first polarized light and the second polarized light at an acute angle. To be specific, the polarizing beam splitter A includes a first prism block A1 and a second prism block A2 along a transfer path of light. An optic axis (a c axis) of the first prism block A1 is parallel to the Y axis, and an optic axis (a c axis) of the second prism block A2 is parallel to the X axis.

When incident on the optical structure 100, the first polarized light is linearly polarized light in which the direction of vibration of the electric field is parallel to the Y axis, and the second polarized light is linearly polarized light in which the direction of vibration of the electric field is parallel to the X axis.

When light is incident on the primary first prism block A1, it is the extraordinary light because the direction of vibration and the optic axis of the first polarized light are parallel. However, when the light is input into the second prism block A2 beyond the junction plane of these blocks, the direction of vibration and the optic axis of the first polarized light are perpendicular, and the light is propagated as the ordinary light.

On the other hand, when light is incident on the primary first prism block A1, it is the ordinary light because the direction of vibration and the optic axis of the second polarized light are perpendicular. However, when the light is input into the second prism block A2 beyond the junction plane of these blocks, the direction of vibration and the optic axis of the second polarized light are parallel, and the light is propagated as the extraordinary light.

When the input light travels beyond the junction plane inside the polarizing beam splitter A, if the prism blocks constituting this are set to make a refractive index for the ordinary light greater than a refractive index for the extraordinary light, the ordinary light is bent in a direction in which it moves toward a normal of the junction plane, and the extraordinary light is bent in a direction in which it moves away from the normal of the junction plane. In this way, the input light having the same wavelength is split by the polarizing beam splitter A so as to travel in other directions according to the orientations of polarization.

A deflected amount of the light in the traveling direction in the polarizing beam splitter A depends on (1) an angle θ formed between the junction plane of the first prism block A1 and the second prism block A2 and an XY plane within a YZ plane, (2) materials of the first and second prism blocks A1 and A2, and (3) directions of the optic axes of the first and second prism blocks A1 and A2 (see FIG. 3). These elements will be described below.

Light incoming and outgoing planes of the polarizing beam splitter A are together parallel to the XY plane. This light outgoing plane is joined with a light incoming plane of the split angle compensator B of the next stage. These planes may be physically in contact with each other, and can also be separated from each other.

Next, the split angle compensator B will be described.

The split angle compensator B of this example corrects the traveling directions of the first polarized light and the second polarized light, and makes the split angles narrow. To be specific, the split angle compensator B includes a third prism block B1 and a fourth prism block B2 along the transfer path of light. An optic axis (a c axis) of the third prism block B1 is parallel to the Y axis, and an optic axis (a c axis) of the fourth prism block B2 is parallel to the X axis.

When light is incident upon the third prism block B1, it is the extraordinary light because the direction of vibration and the optic axis of the first polarized light are parallel. However, when the light is input into the fourth prism block B2 beyond a junction plane of the blocks in the split angle compensator B, the direction of vibration and the optic axis of the first polarized light are perpendicular, and the light is propagated as the ordinary light.

On the other hand, when light is incident on the primary first prism block A1, it is the ordinary light because the direction of vibration and the optic axis of the second polarized light are perpendicular. However, when the light is input into the fourth prism block B2 beyond the junction plane of the blocks in the split angle compensator B, the direction of vibration and the optic axis of the second polarized light are parallel, and the light is propagated as the extraordinary light.

When the input light travels beyond the junction plane inside the split angle compensator B, if the prism blocks constituting this are set to make a refractive index for the ordinary light greater than a refractive index for the extraordinary light, the ordinary light is bent in a direction in which it moves away from a normal of the junction plane, and the extraordinary light is bent in a direction in which it moves toward the normal of the junction plane. In this way, the traveling directions of the light can be corrected by use of the Wollaston prism.

A deflected amount of the light in the traveling direction in the split angle compensator B depends on (1) an angle θ' formed between the junction plane of the third prism block B1 and the fourth prism block B2 and the XY plane within the YZ plane, (2) materials of the third and fourth prism blocks B1 and B2, and (3) directions of the optic axes of the third and fourth prism blocks B1 and B2 (see FIG. 3). These elements will be described below.

A light outgoing plane of the split angle compensator B is parallel to the XY plane. In this light outgoing plane, an outgoing position of the first polarized light (the ordinary light) of the first input light (of the first wavelength λ1) and an outgoing position of the second polarized light (the extraordinary light) are separated in a direction of the Y axis by a distance L1, and an outgoing position of the first polarized light (the ordinary light) of the second input light (of the second wavelength λ2) and an outgoing position of the second polarized light (the extraordinary light) is separated in the direction of the Y axis by a distance L2. A distance between the outgoing positions of the ordinary light of the first input light and the ordinary light of the second input light is d1, and a A distance between the outgoing positions of the extraordinary light of the first input light and the extraordinary light of the second input light is d2.

The light incoming and outgoing planes of the split angle compensator B are together parallel to the XY plane. This light outgoing plane is joined with a light incoming plane of the outgoing position compensator C of the next stage. These planes may be physically in contact with each other, and can also be separated from each other.

Next, the outgoing position compensator C will be described.

The outgoing position compensator C of this example is made up of a block formed of a homogeneous single material. This block may have a shape such as a columnar shape whose central axis is the Z axis, a prismatic shape, a cuboidal shape, a tabular shape, or the like. In one example, the block is used as a block formed of a cuboidal dielectric, and the light incoming plane and the light outgoing plane are together adapted to be parallel to the XY plane. As permittivity becomes high, the refractive index becomes high. Thus, the prism block and the outgoing position compensator using a refractive action are all formed of a dielectric material (an insulator).

The outgoing position compensator C corrects a position and traveling direction of the first polarized light, which is separated and output by the distance d1, on the output plane of the split angle compensator B of the front stage, and simultaneously corrects a position and traveling direction of the second polarized light, which is separated and output by the distance d2.

Therefore, the light outgoing position and traveling direction of the first polarized light of the first input light can be made to coincide with those of the first polarized light of the second input light, and the light outgoing position and traveling direction of the second polarized light of the first input light can be made to coincide with those of the second polarized light of the second input light.

In the case of a uniaxial crystal, the outgoing position compensator C preferably makes use of one having an optic axis parallel to the Z axis, and may be formed of a birefringent material. In the case of a biaxial crystal, birefringence occurs despite coincidence of optic axes, and a design is made difficult.

The outgoing position compensator C can also formed of a birefringent material as well as a material in which a refractive index within an entire volume is uniform.

In the above embodiment, since the split angle compensator B and the outgoing position compensator C are provided, the positional correction caused by the alignment compensator 10 having these is made easy. The alignment compensator 10 is optical path correcting means using the fact that different wavelengths pass other traveling paths. In a case in which light of different wavelengths is input to different positions in different traveling directions, the optical path correcting means is means for causing the outgoing positions and the traveling directions to coincide with each other on the light outgoing plane of the light. If one of the wavelengths is set for the invisible light (the terahertz wave), and the other wavelength located at a band discontinuous to this is set for the visible light (the monitoring light), the invisible light and the visible light that are input to the polarizing beam splitter on the same axis appear at the same position on the light outgoing plane of the alignment compensator 10, and travel in the same direction. Therefore, the position of the visible light is monitored, and thereby the position of the invisible light can be accurately monitored.

Figure 4:
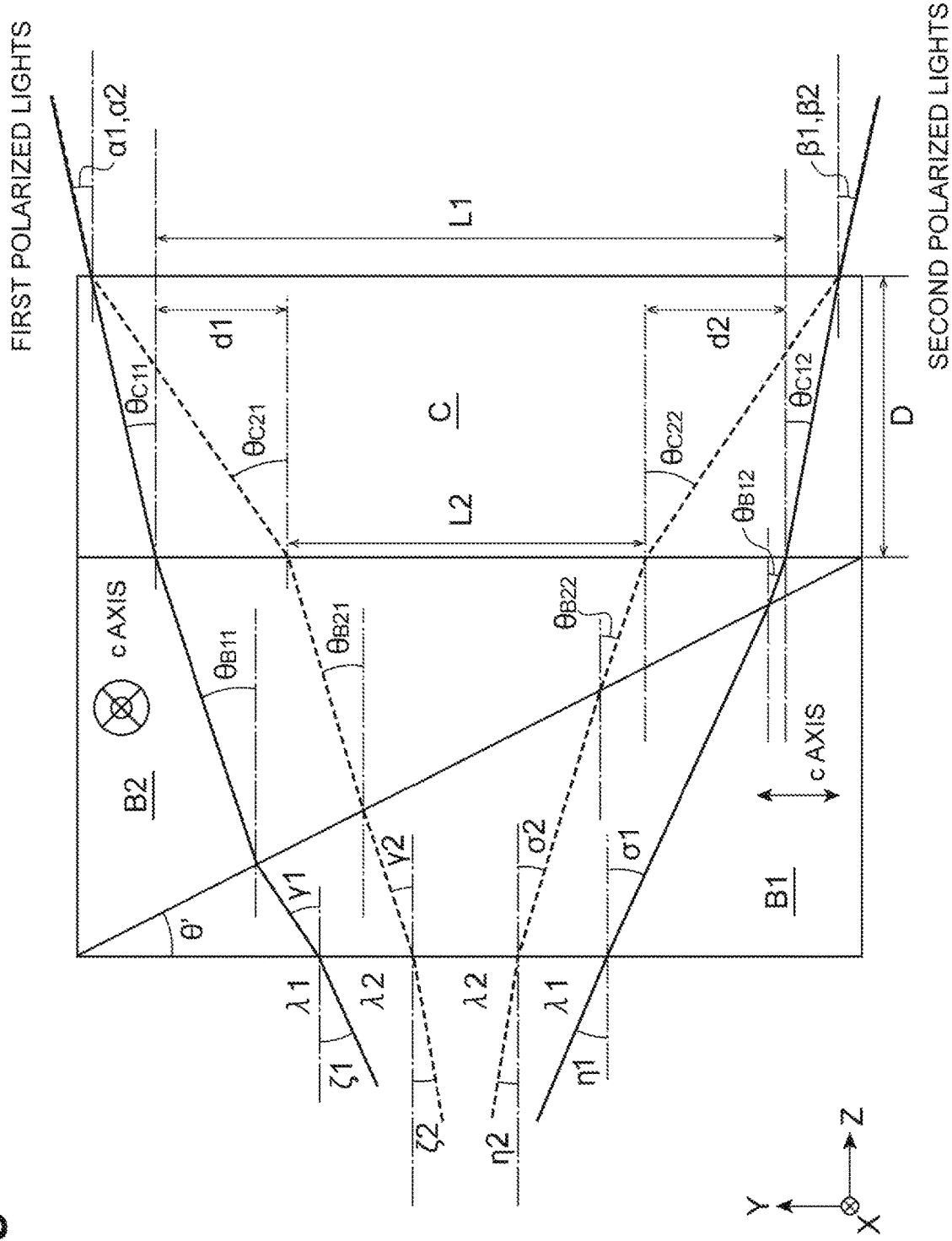
FIG. 4 is an enlarged diagram illustrating a split angle compensator and an outgoing position compensator which are illustrated in FIG. 3.

FIG. 4 is an enlarged diagram illustrating the split angle compensator B and the outgoing position compensator C illustrated in FIG. 3.

After the first polarized light of the first input light (of the first wavelength λ1) is incident on the third prism block B1 of the split angle compensator B, it is refracted and travels on the junction plane between the third prism block B1 and the fourth prism block B2 at a split angle $\theta_{B11}$ from the Z axis. After the first polarized light of the second input light (of the second wavelength θ2) is incident on the third prism block B1 of the split angle compensator B, it is refracted and travels on the junction plane between the third prism block B1 and the fourth prism block B2 at a split angle $\theta_{B21}$ from the Z axis.

After the second polarized light of the first input light (of the first wavelength θ1) is incident on the third prism block B1 of the split angle compensator B, it is refracted and travels on the junction plane between the third prism block B1 and the fourth prism block B2 at a split angle $\theta_{B12}$ from the Z axis. After the second polarized light of the second input light (of the second wavelength λ2) is incident on the third prism block B1 of the split angle compensator B, it is refracted and travels on the junction plane between the third prism block B1 and the fourth prism block B2 at a split angle $\theta_{B22}$ from the Z axis.

Since the light incoming plane of the outgoing position compensator C is parallel to the XY plane, a normal thereof is parallel to the Z axis. Therefore, the split angles from the Z axis coincide with incoming angles of the light toward the outgoing position compensator C.

Thereby, the first polarized light of the first input light and the first polarized light of the second input light separated by the distance d1 are emitted from the same position on the light outgoing plane of the outgoing position compensator C. The outside of the outgoing position compensator C is air, and the first polarized light of the first input light and the first polarized light of the second input light travel in the same direction due to a refractive index difference between the outgoing position compensator C and the air.

The first polarized light of the first input light (of the first wavelength λ1) is refracted and travels at an outgoing angle $\theta_{C11}$ (i.e the split angle from the Z axis) on the junction plane (the XY plane) between the fourth prism block B2 of the split angle compensator B and the outgoing position compensator C. The first polarized light of the second input light (of the second wavelength λ2) is refracted and travels at an outgoing angle $\theta_{C21}$ (i.e the split angle from the Z axis) on the junction plane (the XY plane) between the fourth prism block B2 of the split angle compensator B and the outgoing position compensator C.

The second polarized light of the first input light (of the first wavelength λ1) is refracted and travels at an outgoing angle $\theta_{C12}$ (i.e the split angle from the Z axis) on the junction plane (the XY plane) between the fourth prism block B2 of the split angle compensator B and the outgoing position compensator C. The second polarized light of the second input light (of the second wavelength λ2) is refracted and travels at an outgoing angle $\theta_{C22}$ (i.e the split angle from the Z axis) on the junction plane (the XY plane) between the fourth prism block B2 of the split angle compensator B and the outgoing position compensator C.

Thereby, the second polarized light of the first input light and the second polarized light of the second input light separated by the distance d2 are emitted from the same position on the light outgoing plane of the outgoing position compensator C. The outside of the outgoing position compensator C is the air, and the second polarized light of the first input light and the second polarized light of the second input light travel in the same direction due to a refractive index difference between the outgoing position compensator C and the air.

In the optical structure 100, the alignment compensator 10 includes the split angle compensator B and the outgoing position compensator C, and causes the positions and directions of the aforementioned output light to coincide with each other. Thus, in the following parameters, the split angle compensator B satisfies θ2−θ1>θ2'−θ1', and a difference between the split angles is reduced before and after the input. The first wavelength λ1 is longer than the second wavelength λ2, and θ1 is greater than θ2.

That is, the parameters are as follows.
- θ1: The split angle when the first input light is input to the polarizing beam splitter A
- θ2: The split angle when the second input light is input to the polarizing beam splitter A
- θ1' (=$\theta_{B11}$+$\theta_{B12}$): The split angle in the split angle compensator B when the first polarized light and the second polarized light originating from the first input light (of the first wavelength λ1) are input to the split angle compensator B
- θ2' (=$\theta_{B21}$+$\theta_{B22}$): The split angle in the split angle compensator B when the first polarized light and the second polarized light originating from the second input light (of the second wavelength λ2) are input to the split angle compensator B The light outgoing plane (the fourth prism block B2) of the split angle compensator B has the following parameters.
- $n_{B1P}$: The refractive index for the first polarized light of the first wavelength λ1
- $n_{B1S}$: The refractive index for the second polarized light of the first wavelength λ1

$n_{B2P}$: The refractive index for the first polarized light of the second wavelength $\lambda 2$ $n_{B2S}$: The refractive index for the second polarized light of the second wavelength $\lambda 2$ L1: The separation distance between the first polarized light and the second polarized light originating from the first input light (of the first wavelength $\lambda 1$) on the light outgoing plane of the split angle compensator B L2: The separation distance between the first polarized light and the second polarized light originating from the second input light (of the second wavelength $\lambda 2$) on the light outgoing plane of the split angle compensator B In addition, the outgoing position compensator C has the following parameters.

$n_{C1}$: The refractive index at the first wavelength $\lambda 1$ $n_{C2}$: The refractive index at the second wavelength $\lambda 2$ D: The thickness (in the direction of the Z axis)

In the examples of FIGS. 3 and 4, the Wollaston prism is used. In the Wollaston prism, two uniaxial or biaxial crystals cut out with different crystallographic axes are configured to be joined at a joint angle $\theta$, and the crystallographic axes are orthogonal to each other. The split angles differ according to the joint angle $\theta$ and refractive index wavelength dispersion characteristics of the crystals. In the case of the light incident on the Wollaston prism, the angles of the ordinary light and the extraordinary light are changed, but the split angles of polarization components of the first input light and the second input light coincide with each other in the split angle compensator B. To this end, a material and a joint angle $\theta'$ of the Wollaston prism are designed.

To cause deviation amounts of the distance d1 to coincide with each other in the outgoing position compensator C, d1 satisfies the following formula.

$$d1 = (D \cdot \tan \theta_{C21} - D \cdot \tan \theta_{C11})$$

$\theta_{C11}$ and $\theta_{C21}$ satisfy the following formulae.

$$\theta_{C11} = \sin^{-1}((n_{B1P} \cdot \sin \theta_{B11})/n_{C1})$$

$$\theta_{C21} = \sin^{-1}((n_{B2P} \cdot \sin \theta_{B21})/n_{C2})$$

Likewise, to cause deviation amounts of the distance d2 to coincide with each other in the outgoing position compensator C, d2 satisfies the following formula.

$$d2 = (D \cdot \tan \theta_{C22} - D \cdot \tan \theta_{C12})$$

$\theta_{C12}$ and $\theta_{C22}$ satisfy the following formulae.

$$\theta_{C12} = \sin^{-1}((n_{B1S} \cdot \sin \theta_{B12})/n_{C1})$$

$$\theta_{C22} = \sin^{-1}((n_{B2S} \cdot \sin \theta_{B22})/n_{C2})$$

As described above, to cause the positions and directions of the outgoing light to coincide with each other, a refractive index $n_{B1S}$, a refractive index $n_{B1P}$, a refractive index $n_{B2S}$, a refractive index $n_{B2P}$, a separation distance L1, a separation distance L2, a refractive index $n_{C1}$, a refractive index $n_{C2}$, and a thickness D satisfy the following relational formula (1).

$$L1 - L2 = (D \cdot \tan \theta_{C21} - D \cdot \tan \theta_{C11}) + (D \cdot \tan \theta_{C22} - D \cdot \tan \theta_{C12}) \quad (1)$$

$\theta_{C11}$, $\theta_{C21}$, $\theta_{C12}$, and $\theta_{C22}$ satisfy the following formulae.

$$\theta_{C11} = \sin^{-1}((n_{B1P} \cdot \sin \theta_{B11})/n_{C1})$$

$$\theta_{C21} = \sin^{-1}((n_{B2P} \cdot \sin \theta_{B21})/n_{C2})$$

$$\theta_{C12} = \sin^{-1}((n_{B1S} \cdot \sin \theta_{B12})/n_{C1})$$

$$\theta_{C22} = \sin^{-1}((n_{B2S} \cdot \sin \theta_{B22})/n_{C2})$$

As described above, the deflected amounts (the split angles) of the light in the traveling directions in the polarizing beam splitter A depend on (1) an angle $\theta$ at which the junction plane between the first prism block A1 and the second prism block A2 is formed with the XY plane within the YZ plane, (2) materials (refractive indices) of the first and second prism blocks A1 and A2, and (3) directions of the optic axes of the first and second prism blocks A1 and A2.

Likewise, as described above, the deflected amounts of the light in the traveling directions in the split angle compensator B depend on (1) an angle $\theta'$ at which the junction plane between the third prism block B1 and the fourth prism block B2 is formed with the XY plane within the YZ plane, (2) materials (refractive indices) of the third and fourth prism blocks B1 and B2, and (3) directions of the optic axes of the third and fourth prism blocks B1 and B2.

When an outgoing angle of the first polarized light (the component of the first wavelength $\lambda 1$) emitted from the split angle compensator B and the outgoing position compensator C is defined as $\alpha 1$, an outgoing angle of the first polarized light (the component of the second wavelength $\lambda 2$) is defined as $\alpha 2$, an outgoing angle of the second polarized light (the component of the first wavelength $\lambda 1$) is defined as $\beta 1$, and an outgoing angle of the second polarized light (the component of the second wavelength $\lambda 2$) is defined as $\beta 2$, the following relational formula is satisfied in the same manner as the above. A refractive index of air outside the optical structure is defined as $n_0$. As described above, $n_{C1}$ is the refractive index at the first wavelength and $n_{C2}$ is the refractive index at the second wavelength $\lambda 2$.

$$\alpha 1 = \sin^{-1}((n_{C1} \cdot \sin \theta_{C11})/n_0)$$

$$\alpha 2 = \sin^{-1}((n_{C2} \cdot \sin \theta_{C21})/n_0)$$

$$\beta 1 = \sin^{-1}((n_{C1} \cdot \sin \theta_{C12})/n_0)$$

$$\beta 2 = \sin^{-1}((n_{C2} \cdot \sin \theta_{C22})/n_0)$$

The first polarized light of two wavelengths needs to satisfy almost $\alpha 1 = \alpha 2$ to travel in the same direction, and the second polarized light of two wavelengths may satisfy almost $\beta 1 = \beta 2$ to travel in the same direction. These conditions are set as follows, and can thereby be satisfied.

First, if the refractive indices $n_{C1}$ and $n_{C2}$ decided from the material of the outgoing position compensator C and the refractive index $n_0$ of air are known, the split angles ($\theta_{C11}$, $\theta_{C21}$, $\theta_{C12}$, and $\theta_{C22}$) satisfying $\alpha 1 = \alpha 2$ and $\beta 1 = \beta 2$ can be obtained. Values of the split angles ($\theta_{B11}$, $\theta_{B21}$, $\theta_{B12}$, and $\theta_{B22}$) of the front stage can be fixed from values of these split angles according to the above relational formula (1). Further, values of the split angles $\gamma 1$, $\gamma 2$, $\sigma 1$, and $\sigma 2$, and values of the incoming angles $\zeta 1$, $\zeta 2$, $\eta 1$, and $\eta 2$, described in FIG. 4 are changed by a simulator to satisfy the aforementioned conditions of the same position and the same traveling direction, and thereby conditions to be satisfied by $\theta'$ can be found. Various simulators may be used as an optical simulator. For example, a program "code V" available from Synopsys Co. Ltd. or the like may be used.

The light incoming plane (the third prism block B1) of the split angle compensator B has the following parameters.

$n_{B1S}$: The refractive index for the first polarized light of the first wavelength $\lambda 1$ $n_{B1P}$: The refractive index for the second polarized light of the first wavelength $\lambda 1$ $n_{B2S}$: The refractive index for the first polarized light of the second wavelength $\lambda 2$ $n_{B2P}$: The refractive index for the second polarized light of the second wavelength λ2

In this case, an inclined angle θ' (an angle of a corner that is most distant from the XZ plane in a ZY cross section) at the top of the third prism block B1 satisfies the following relational formulae. Thereby, γ1, σ1, γ2, and σ2, and refractive indices required to satisfy the conditions are decided.

$$n_{B1S} \cdot \sin(\gamma 1 - \theta') = n_{B1P} \cdot \sin(\theta' - \theta_{B11})$$

$$n_{B1P} \cdot \sin(\sigma 1 + \theta') = n_{B1S} \cdot \sin(\theta' + \theta_{B12})$$

$$n_{B2P} \cdot \sin(\gamma 2 - \theta') = n_{B2S} \cdot \sin(\theta' - \theta_{B21})$$

$$n_{B2S} \cdot \sin(\sigma 1 + \theta') = n_{B2P} \cdot \sin(\theta' + \theta_{B22})$$

The light incoming plane (the first prism block A1) of the polarizing beam splitter A has the following parameters.

$n_{A1S}$: The refractive index for the first polarized light of the first wavelength λ1

$n_{A1P}$: The refractive index for the second polarized light of the first wavelength λ1

$n_{A2S}$: The refractive index for the first polarized light of the second wavelength λ2

$n_{A2P}$: The refractive index for the second polarized light of the second wavelength λ2

An inclined angle θ (an angle of a corner that is most distant from the XZ plane in the ZY cross section) at the top of the first prism block A1 of the front stage satisfies the following relational formulae. The values of the incoming angles ζ1, ζ2, η1, and η2 are changed by the simulator to satisfy the aforementioned conditions of the same position and the same traveling direction, and thereby conditions to be satisfied by θ can be found.

$$n_{A1S} \cdot \sin \theta = n_{A1P} \cdot \sin(\theta - \zeta 1)$$

$$n_{A1P} \cdot \sin \theta = n_{A1S} \cdot \sin(\theta - \eta 1)$$

$$n_{A2S} \cdot \sin \theta = n_{A2P} \cdot \sin(\theta - \zeta 2)$$

$$n_{A2P} \cdot \sin \theta = n_{A2S} \cdot \sin(\theta - \eta 2)$$

In FIG. 4, ζ1, η1, ζ2, and θ2 indicate the split angles of the first polarized light of the first wavelength, the second polarized light of the first wavelength, the first polarized light of the second wavelength, and the second polarized light of the second wavelength, which are based on the Z axis within the polarizing beam splitter A.

In reality, θ and θ' as well as the refractive indices, and a thickness of each optical element according to circumstances are adjusted, and thereby the outgoing angles are adjusted to satisfy α1=α2 and β1=β2 by matching the beam outgoing positions of the two wavelengths.

In the optical structure, the polarizing beam splitter A and the split angle compensator B are formed of a Wollaston prism. In the case of this structure, the Wollaston prism can be easily available on the market, there is an advantage in that assembly is facilitated.

The aforementioned structure can be modified in various ways.

Next, the prism block constituting the Wollaston prism that can be used for the polarizing beam splitter A and the split angle compensator B will be described.

FIGS. 5A, 5B, 5C, and 5D are diagrams illustrating various blocks, each of which constitutes a prism.

FIG. 5A is a prism block in which the YZ cross section is in a triangular shape, a light incoming plane $S1_{IN}$ is parallel to the XY plane, and a light outgoing plane (a junction plane) $S1_{OUT}$ joined with a prism of the next stage intersects the XY plane within the YZ cross section at an angle θ. An optic axis (a c axis) is parallel to the Y axis.

FIG. 5B is a prism block in which the YZ cross section is in a triangular shape, a virtual reference plane Sv located at a leading end of a light incoming side is made parallel to the XY plane, and a light incoming plane (a junction plane) $S2_{IN}$ joined with the prism of the front stage intersects a light outgoing plane $S2_{OUT}$ within the YZ cross section at an angle θ. Since the light outgoing plane $S2_{OUT}$ is parallel to the XY plane, and is parallel to the virtual reference plane Sv, this angle θ is an angle at which the junction plane is formed with the XY plane. An optic axis (a c axis) is parallel to the X axis.

FIG. 5C is a prism block in which the YZ cross section is in a triangular shape, a light incoming plane $S1_{IN}$ is parallel to the XY plane, and a light outgoing plane (a junction plane) $S1_{OUT}$ joined with a prism of the next stage intersects the XY plane within the YZ cross section at an angle θ, but has a converse direction of inclination with respect to the junction plane illustrated in FIG. 5A. An optic axis (a c axis) is parallel to the Y axis.

FIG. 5D is a prism block in which the YZ cross section is in a triangular shape, a virtual reference plane Sv located at a leading end of a light incoming side is made parallel to the XY plane, and a light incoming plane (a junction plane) $S2_{IN}$ joined with the prism of the front stage intersects a light outgoing plane $S2_{OUT}$ within the YZ cross section at an angle θ, but has a converse direction of inclination with respect to the junction plane illustrated in FIG. 5B. Since the light outgoing plane $S2_{OUT}$ is parallel to the XY plane, and is parallel to the virtual reference plane Sv, this angle θ is an angle at which the junction plane is formed with the junction plane. An optic axis (a c axis) is parallel to the X axis.

When the polarizing beam splitter A and the split angle compensator B are formed of prism blocks, each of these is formed by attaching the prism block of FIG. 5A and the prism block of FIG. 5B on the junction plane, or by attaching the prism block of FIG. 5C and the prism block of FIG. 5D on the junction plane.

In the case of the structure illustrated in FIG. 3, the prism block of FIG. 5A and the prism block of FIG. 5B may be stuck. That is, when the polarizing beam splitter A is formed, the prism block of FIG. 5A is used as the first prism block A1, and the prism block of FIG. 5B is used as the second prism block A2. When the split angle compensator B is formed, the prism block of FIG. 5A is used as the third prism block B1, and the prism block of FIG. 5B is used as the fourth prism block B2.

FIG. 6 is a diagram illustrating an optical structure according to another embodiment.

A fundamental difference from the structure illustrated in FIG. 3 is that the split angle compensator B is made up of two Wollaston prisms, and the others are the same and have the same effects. That is, the optical structure 100 includes a polarizing beam splitter A and an alignment compensator 10. The alignment compensator 10 includes a split angle compensator B and an outgoing position compensator C.

The polarizing beam splitter A splits input light input from an incoming plane into first polarized light (ordinary light when output from the polarizing beam splitter) and second polarized light (extraordinary light when output from the polarizing beam splitter) at an acute angle in the same way as the above. The alignment compensator 10 is disposed at a rear stage of the polarizing beam splitter A, and outputs the first polarized light and the second polarized light input from the polarizing beam splitter A from a light outgoing plane.

When first input light having a first wavelength λ1 is input to the polarizing beam splitter A and when second input light having a second wavelength λ2 is input to the polarizing beam splitter A, the alignment compensator 10 has parameters of constituents set such that the traveling directions and outgoing positions of the first polarized light of the first input light (of the first wavelength λ1) and the first polarized light of the second input light (of the second wavelength λ2) each coincide with each other on the light outgoing plane thereof, and traveling directions and outgoing positions of the second polarized light of the first input light (of the first wavelength λ1) and the second polarized light of the second input light (of the second wavelength λ2) each coincide with each other on the light outgoing plane thereof.

Final split angles of the first polarized light and the second polarized light output from the outgoing position compensator C become $\theta_{OUT}$. On an image plane, the first polarized light is shifted upward from a reference position, and the second polarized light is shifted downward from the reference position.

The split angle compensator B includes a front-stage split angle compensator and a rear-stage split angle compensator located at a rear stage thereof. The front-stage split angle compensator includes a first prism block $B1_1$ of the front stage and a second prism block $B2_1$ of the front stage, and the rear-stage split angle compensator includes a first prism block $B1_2$ of the rear stage and a second prism block $B2_2$ of the rear stage. The outgoing position compensator C is subjected to no fundamental change, and is formed of sapphire ($Al_2O_3$). However, in comparison with the aforementioned outgoing position compensator C, a thickness D in a direction of the Z axis is increased, and D=80 mm for example.

Parameters of various blocks constituting a prism need to further satisfy a formula obtained by reading θ' into θ" on the conditions of the parameters described in FIG. 3 and further, in addition to a formula of θ', in the same way as this formula. That is, it is necessary to satisfy a condition that, in the neighboring prism blocks $B_{12}$ and $B_{22}$, a product of a refractive index of the prism block $B1_2$ and an incoming angle (a beam incoming angle from a normal perpendicular to a junction plane) toward a prism junction plane is equal to a product of a refractive index of the prism block $B2_2$ and an outgoing angle of a beam from the prism junction plane (a beam outgoing angle from the normal perpendicular to the junction plane). θ is an angle formed by the XY plane and a junction plane of a prism block of an initial stage. When a formula of this inclined angle θ located at a bottom portion within the YZ plane of the polarizing beam splitter A is read in the same way as θ in the case of FIG. 3, the following conditions are satisfied (see FIGS. 3, 4, and 6).

$n_{A1S} \cdot \sin\theta = n_{A1P} \cdot \sin(\theta + \zeta 1)$ $n_{A1P} \cdot \sin\theta = n_{A1S} \cdot \sin(\theta - \eta 1)$ $n_{A2S} \cdot \sin\theta = n_{A2P} \cdot \sin(\theta + \zeta 2)$ $n_{A2P} \cdot \sin\theta = n_{A2S} \cdot \sin(\theta - \eta 2)$ In this optical structure, the prism blocks are arranged in the traveling direction of the input light in the order of types of FIG. 5 (FIGS. 5C, 5D, 5A, 5B, 5A, and 5B).

A birefringent material (quartz, sapphire (a trigonal crystal), $MgF_2$, or the like) may be used as the polarizing beam splitter A and the split angle compensator B, and sapphire ($Al_2O_3$) or the like in which the c axis is parallel to the Z axis may be used as a material of the outgoing position compensator C.

The structure illustrated in FIG. 6 satisfies the above relational formula when overall effects of the two Wollaston prisms constituting the split angle compensator are approximated as those of a single Wollaston prism, and outgoing positions and directions of the output light on a light outgoing plane of an outgoing position compensator of a final stage coincide with each other.

The polarizing beam splitter A is made up of a first Wollaston prism formed by attaching two trigonal crystal blocks A1 and A2 such that the c axes are orthogonal to each other, and the split angle compensator B is made up of a second Wollaston prism formed by attaching two trigonal crystal blocks $B1_1$ and $B2_1$ such that the c axes are orthogonal to each other, and a third Wollaston prism that is disposed at a rear stage of the second Wollaston prism and is formed by attaching two tetragonal crystal blocks $B1_2$ and $B2_2$ such that the c axes are orthogonal to each other.

The c axes of the first, second and third Wollaston prisms are all orthogonal to the traveling directions (the Z axis) of the input light (of the first and second wavelengths λ1 and λ2) toward the polarizing beam splitter A. Therefore, these exert effects of the Wollaston prism.

When the prism block of the trigonal crystal is formed of quartz or sapphire, and the tetragonal crystal block is formed of $MgF_2$, these materials can be easily available on the market, and thus there is an advantage in that assembly is facilitated.

Each of the quartz and the sapphire (the trigonal crystal) has a1, a2, a3, and c axes. Light is orthogonally incident on a plane parallel to the c axis, for instance, a (11$\bar{2}$0) plane, and thereby the quartz and the sapphire can use a birefringent characteristic. $MgF_2$ (the tetragonal crystal) has a and c axes. Light is orthogonally incident on a plane parallel to the c axis, for instance, a (100) plane, and thereby $MgF_2$ can use a birefringent characteristic.

Figure 7:
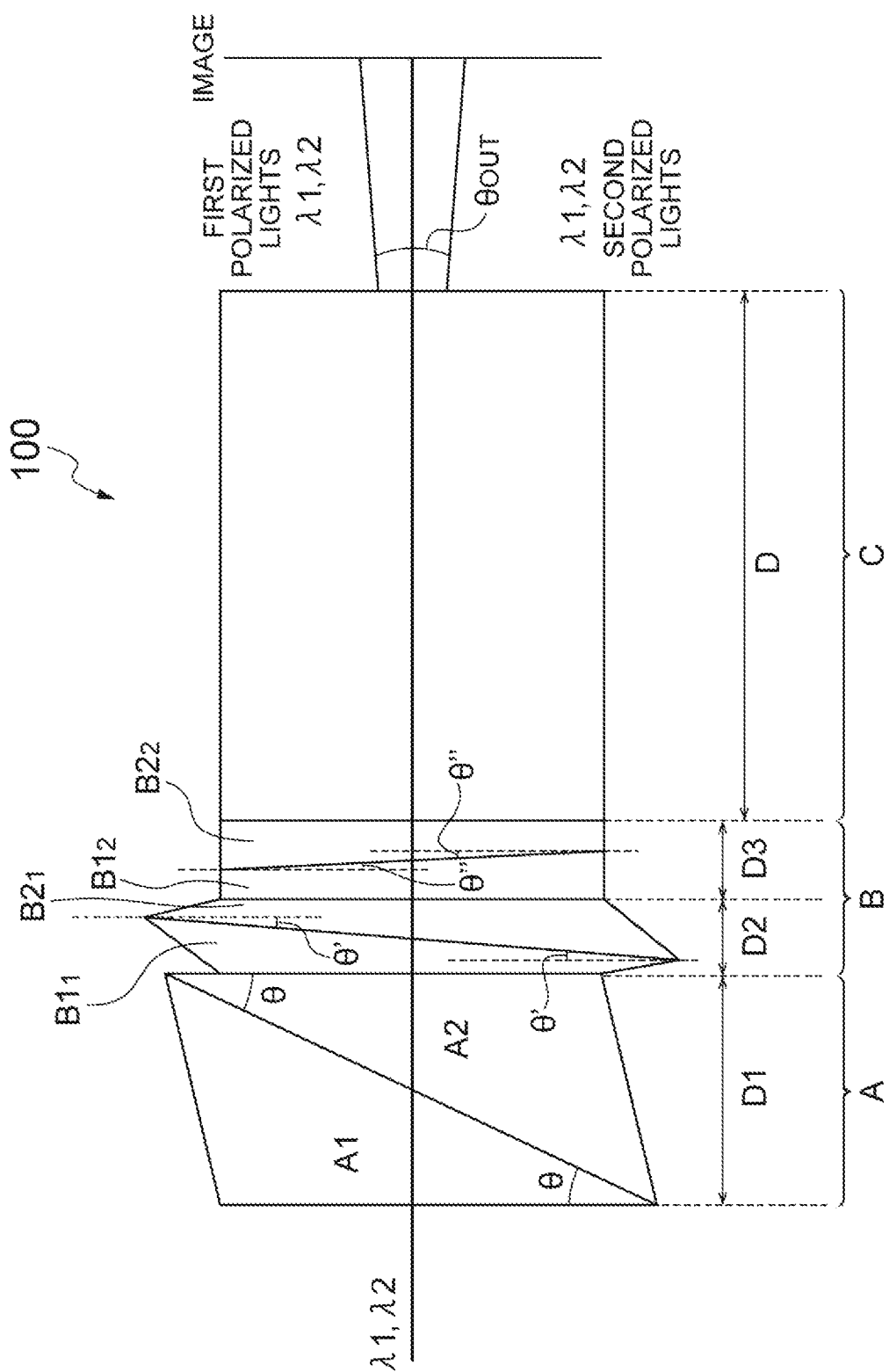
FIG. 7 is a diagram illustrating an optical structure according to an embodiment.

FIG. 7 is a diagram illustrating an optical structure according to an embodiment.

The optical structure of this example is a concrete modification of the optical structure illustrated in FIG. 6, and is identical to that illustrated in FIG. 6 except that directions of prism junction planes in front-stage split angle compensators $B1_1$ and $B2_1$ are converse to those illustrated in FIG. 6.

Figures 8A, 8B:
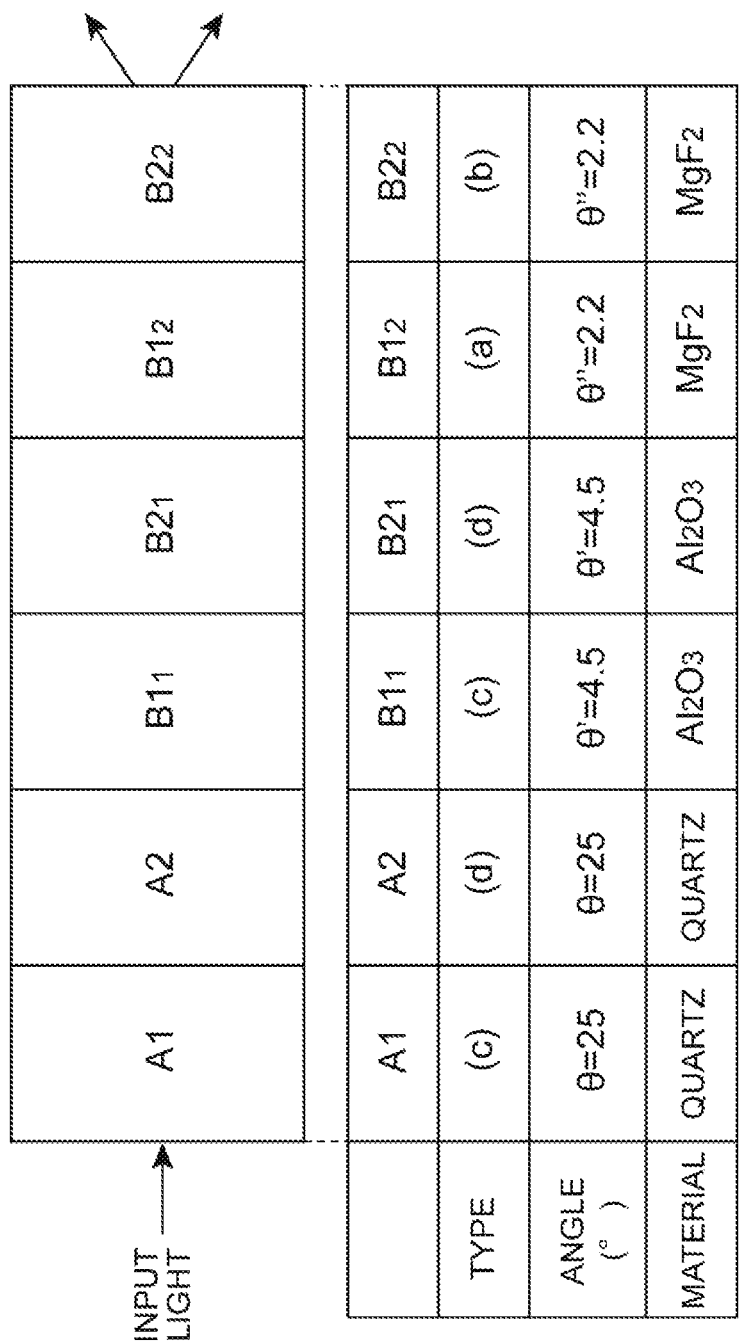
FIGS. 8A and 8B are diagrams for describing parameters of each block constituting the prism.

FIGS. 8A and 8B are diagrams for describing parameters of various blocks constituting the prism of the optical structure illustrated in FIG. 7. Types (c), (d), (c), (d), (a), and (b) of FIG. 8B of the prism arranged in a traveling direction of input light represent the prism blocks of FIGS. 5C, 5D, 5C, 5D, 5A, and 5B, respectively. Angles on a chart are angles (acute angles), each of which is formed by the XY plane and the junction plane of each prism block, and correspond to θ, θ', and θ" in FIG. 7.

A polarizing beam splitter A is formed of quartz. With regard to a split angle compensator B, the front-stage split angle compensators $B1_1$ and $B2_1$ are formed of sapphire ($Al_2O_3$), and rear-stage split angle compensators $B1_2$ and $B2_2$ are formed of $MgF_2$. A material of an outgoing position compensator C is formed of sapphire ($Al_2O_3$) in which the c axis is parallel to the Z axis.

In a concrete example, a thickness D1 of the polarizing beam splitter A in a direction of the Z axis is 15 mm (D1=15 mm), a thickness D2 of the front-stage split angle compensators $B1_1$ and $B2_1$ in the direction of the Z axis is 5 mm (D2=5 mm), a thickness D3 of the rear-stage split angle compensators $B1_2$ and $B2_2$ in the direction of the Z axis is 5 mm (D3=5 mm), and a thickness D of the outgoing position compensator C in an axial direction is 80 mm (D=80 mm).

In the types (a) and (c) of FIGS. 5A and 5C, when the prism is formed of quartz ($SiO_2$) or alumina ($Al_2O_3$), the YZ plane is a plane parallel to a ($\bar{1}$100) plane, and in the types (b) and (d) of FIGS. 5B and 5D, the YZ plane is a plane perpendicular to the c axis, that is, a plane parallel to a (0001) plane. In the types (a) and (c) of FIGS. 5A and 5C, when the prism is formed of magnesium fluoride ($MgF_2$), the YZ plane is a plane parallel to a (100) plane, and in the types (b) and (d) of FIGS. 5B and 5D, the YZ plane is a plane perpendicular to the c axis, that is, a plane parallel to a (001) plane.

In the prism of the type (c) of FIG. 5C which is represented on the chart of FIG. 8B, a light incoming plane $S1_{IN}$ of the quartz is a (11$\bar{2}$0) plane, and a light outgoing plane $S1_{OUT}$ forms an angle θ (=25°) with respect to the c axis within the YZ cross section, and is a plane perpendicular to the YZ plane. A light incoming plane $S1_{IN}$ of $Al_2O_3$ of the type (c) of FIG. 5C is a (11$\bar{2}$0) plane, and a light outgoing plane $S1_{OUT}$ forms an angle θ (=θ'=4.5°) with respect to the c axis within the YZ cross section, and is a plane perpendicular to the YZ plane.

In the prism of the quartz of the type (d) of FIG. 5D which is represented on the chart of FIG. 8B, a virtual XY plane Sv of an incoming side is a (11$\bar{2}$0) plane, and a light incoming plane $S2_{IN}$ forms an angle θ (=25°) with respect to the virtual XY plane Sv of the incoming side within the YZ cross section and is a plane perpendicular to the YZ plane. A light outgoing plane $S2_{OUT}$ is parallel to the virtual XY plane Sv of the incoming side within the YZ cross section, and is a plane perpendicular to the YZ plane.

In the prism of $Al_2O_3$ of the type (d) of FIG. 5D which is represented on the chart of FIG. 8B, a virtual XY plane Sv of an incoming side is a (11$\bar{2}$0) plane, and a light incoming plane $S2_{IN}$ forms an angle θ (=θ'=4.5°) with respect to the virtual XY plane Sv of the incoming side within the YZ cross section and is a plane perpendicular to the YZ plane. A light outgoing plane $S2_{OUT}$ is parallel to the virtual XY plane Sv of the incoming side within the YZ cross section, and is a plane perpendicular to the YZ plane.

In the prism of $MgF_2$ of the type (a) of FIG. 5A which is represented on the chart of FIG. 8B, a light incoming plane $S1_{IN}$ is a plane parallel to a (100) plane, and a light outgoing plane $S1_{OUT}$ forms an angle θ (=θ"=2.2°) with respect to the c axis within the YZ cross section and is a plane perpendicular to the YZ plane.

In the prism of $MgF_2$ of the type (b) of FIG. 5B represented on the chart of FIG. 8B, a virtual XY plane Sv of an incoming side is a (100) plane, and a light incoming plane $S2_{IN}$ forms an angle θ (=θ'=2.2°) with respect to the virtual XY plane Sv of the incoming side within the YZ cross section and is a plane perpendicular to the YZ plane. A light outgoing plane $S2_{OUT}$ is parallel to the virtual XY plane Sv of the incoming side within the YZ cross section, and is a plane perpendicular to the YZ plane.

Even in the case of this example, the structures illustrated in FIGS. 7, 8A, and 8B satisfies the above relational formula when overall effects of the two Wollaston prisms constituting the split angle compensator B are approximated as those of a single Wollaston prism, and outgoing positions and directions of the output light on a light outgoing plane of an outgoing position compensator of a final stage coincide with each other.

In place of the aforementioned Wollaston prism, a Rochon prism may also be used.

Figure 9:
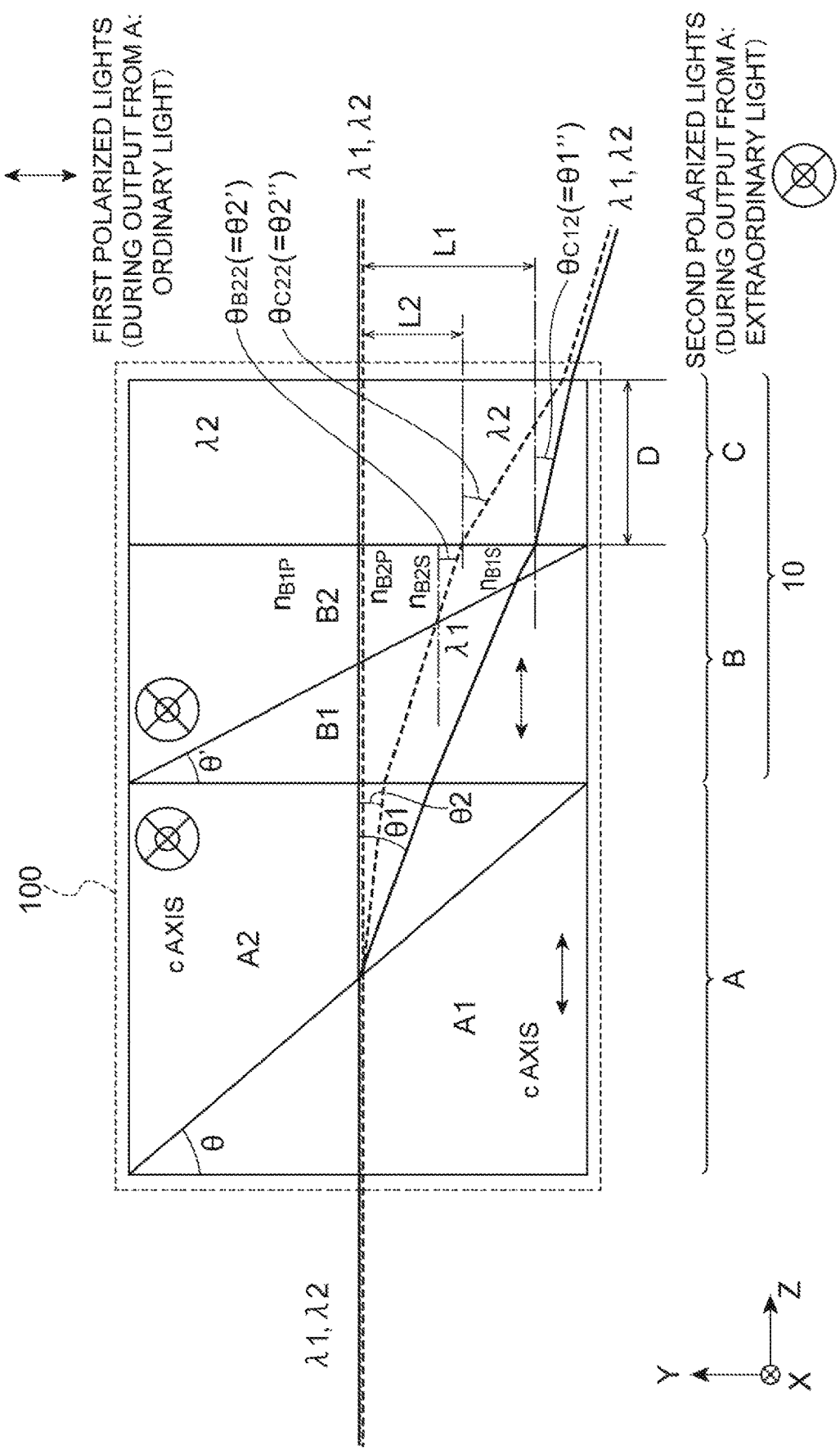
FIG. 9 is a diagram illustrating an optical structure according to an embodiment.

FIG. 9 is a diagram illustrating an optical structure using a Rochon prism according to an embodiment.

A difference in structure from the optical structure using the Wollaston prism is only the direction of the optic axis (the c axis) of the prism block. An optic axis of a first prism block A1 and an optic axis of a third prism block B1 are parallel to each other, and the other structures are identical to those illustrated in FIG. 3.

A first input light (of a first wavelength λ1) and a second input light (of a second wavelength λ2) are coaxially incident on the Rochon prism constituting a polarizing beam splitter A along the Z axis.

A direction of vibration of an electric field of a first polarized light in the polarizing beam splitter A is the Y axis. Since the direction of vibration is always orthogonal to the optic axes (the c axis/the Z axis and the c axis/the X axis) of both of the first prism block A1 and a second prism block A2, the first polarized light (the ordinary light) travels straight in a direction of the Z axis without being refracted on a junction plane between the prism blocks.

A direction of vibration of an electric field of a second polarized light in the polarizing beam splitter A is the X axis. When the direction of vibration is orthogonal to the optic axis (the c axis/the Z axis) of the first prism block A1, but the second polarized light travels beyond the junction plane between the prism blocks, it is parallel to the optic axis (the c axis/the X axis) of the second prism block A2. The second polarized light (the extraordinary light) is refracted and travels on the junction plane.

The same structure using the Rochon prism is used inside a split angle compensator B.

In detail, a direction of vibration of an electric field of a first polarized light in the split angle compensator B is the Y axis. Since the direction of vibration is always orthogonal to the optic axes (the c axis/the Z axis and the c axis/the X axis) of both of the third prism block B1 and a fourth prism block B2, the first polarized light (the ordinary light) travels straight in the direction of the Z axis without being refracted on a junction plane between the prism blocks.

A direction of vibration of an electric field of a second polarized light in the split angle compensator B is the X axis. When the direction of vibration is orthogonal to the optic axis (the c axis/the Z axis) of the third prism block B1, but the second polarized light travels beyond the junction plane between the prism blocks, it is parallel to the optic axis (the c axis/the X axis) of the fourth prism block B2. The second polarized light (the extraordinary light) is refracted and travels on the junction plane.

An outgoing position compensator C causes the first polarized light that is incident to travel straight, and corrects an optical path of the second polarized light and emits the second polarized light in the same way as illustrated in FIG. 3.

In the Rochon prism, two uniaxial or biaxial crystals cut out with different crystallographic axes are configured to be joined at a joint angle θ, and the crystallographic axes are orthogonal to each other. Split angles differ according to the joint angle θ and refractive index wavelength dispersion characteristics of the crystals. In the Rochon prism of the split angle compensator B, a material and a joint angle θ' are designed such that split angles of first input light and second input light coincide with each other. When the light is emitted from the Rochon prism, the split angles of the first input light and the second input light coincide with each other, but optical paths are shifted. In the outgoing position compensator C, the first input light and the second input light are refracted at different angles, and the optical paths thereof approximate each other. The first input light and the second input light are propagated a specific distance, and coincide with each other. A thickness and material of the outgoing position compensator C are decided such that the light is emitted into air at a coincided place. After the light is emitted into air, the split angles coincide with each other again, and further the optical paths also coincide with each other.

Figure 10:
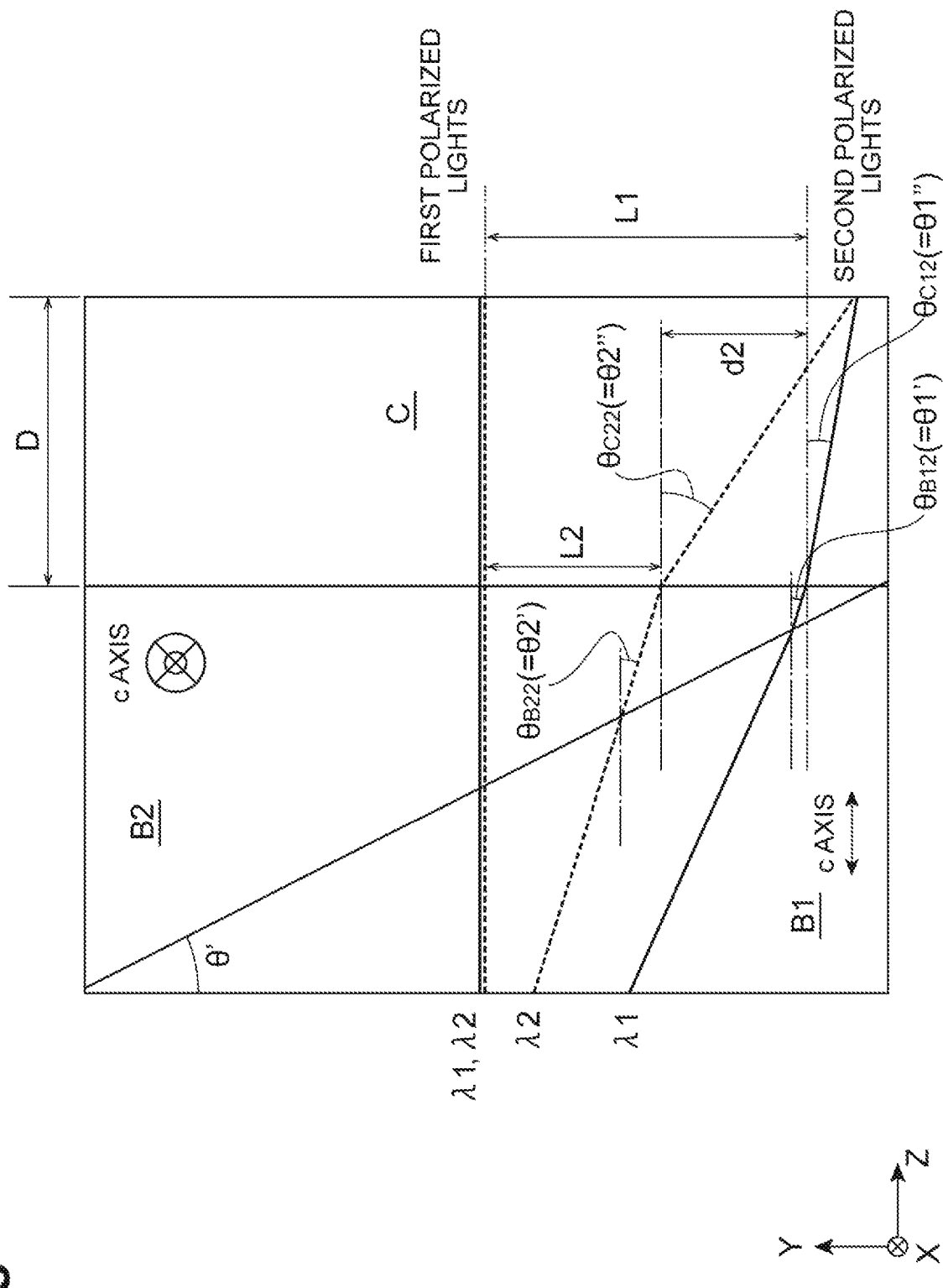
FIG. 10 is an enlarged diagram illustrating a split angle compensator and an outgoing position compensator which are illustrated in FIG. 9.

FIG. 10 is an enlarged diagram illustrating the split angle compensator B and the outgoing position compensator C illustrated in FIG. 9.

After the first polarized light of the first input light (of the first wavelength λ1) is incident on the third prism block B1 of the split angle compensator B, it travels without being refracted on the junction plane between the third prism block B1 and the fourth prism block B2. After the first polarized light of the second input light (of the second wavelength λ2) is incident on the third prism block B1 of the split angle compensator B, it travels without being refracted on the junction plane between the third prism block B1 and the fourth prism block B2.

The first polarized light of the first input light (of the first wavelength λ1) is orthogonally incident on the junction plane (the XY plane) between the fourth prism block B2 of the split angle compensator B and the outgoing position compensator C, and travels straight without being refracted on the junction plane. In other words, the outgoing angle (=the split angle $\theta_{C11}$ from the Z axis) at this time is 0°. The first polarized light of the second input light (of the second wavelength λ2) is orthogonally incident on the junction plane (the XY plane) between the fourth prism block B2 of the split angle compensator B and the outgoing position compensator C, and travels straight without being refracted on the junction plane. In other words, the outgoing angle (=the split angle $\theta_{C21}$ from the Z axis) at this time is 0°.

Thereby, the first polarized light of the first input light and the first polarized light of the second input light are adapted to be emitted from the same position in a direction perpendicular to the light outgoing plane of the outgoing position compensator C. The outside of the outgoing position compensator C is air. The output light is perpendicular to the light outgoing plane, and the first polarized light of the first input light and the first polarized light of the second input light are adapted to travel in the same direction (the direction of the Z axis).

After the second polarized light of the first input light (of the first wavelength λ1) is incident on the third prism block B1 of the split angle compensator B, it is refracted and travels at the split angle $\theta_{B12}$ from the Z axis on the junction plane between the third prism block B1 and the fourth prism block B2. After the second polarized light of the second input light (of the second wavelength λ2) is incident on the third prism block B1 of the split angle compensator B, it is refracted and travels at the split angle $\theta_{B22}$ from the Z axis on the junction plane between the third prism block B1 and the fourth prism block B2.

Since the light incoming plane of the outgoing position compensator C is parallel to the XY plane, a normal thereof is parallel to the Z axis. Therefore, the split angle from the Z axis coincides with the incoming angle of the light toward the outgoing position compensator C.

The second polarized light of the first input light (of the first wavelength λ1) is refracted and travels at the outgoing angle (=the split angle from the Z axis) $\theta_{C12}$ on the junction plane (the XY plane) between the fourth prism block B2 of the split angle compensator B and the outgoing position compensator C. The second polarized light of the second input light (of the second wavelength λ2) is refracted and travels at the outgoing angle (=the split angle from the Z axis) $\theta_{C22}$ on the junction plane (the XY plane) between the fourth prism block B2 of the split angle compensator B and the outgoing position compensator C.

Thereby, the second polarized light of the first input light and the second polarized light of the second input light separated by a distance d2 on the light outgoing plane of the split angle compensator B are adapted to be emitted from the same position on the light outgoing plane of the outgoing position compensator C. The outside of the outgoing position compensator C is air, and the second polarized light of the first input light and the second polarized light of the second input light are adapted to travel in the same direction due to a refractive index difference between the outgoing position compensator C and the air.

Even in the optical structure 100 using the Rochon prism, an alignment compensator 10 includes the split angle compensator B and the outgoing position compensator C, and causes the outgoing positions and the traveling directions of the output light of the first polarized light of the different wavelengths and the second polarized light of the different wavelengths. Thus, in the following parameters, the split angle compensator B satisfies θ2−θ1>θ2'−θ1', and a difference between the split angles is reduced before and after the input. The first wavelength λ1 is longer than the second wavelength λ2, and θ1 is greater than θ2.

That is, the parameters are as follows.

θ1: The split angle when the first input light is input to the polarizing beam splitter A θ2: The split angle when the second input light is input to the polarizing beam splitter A θ1' (=$\theta_{B12}$): The split angle in the split angle compensator B when the first polarized light and the second polarized light originating from the first input light (of the first wavelength λ1) are input to the split angle compensator B θ2' (=$\theta_{B22}$): The split angle in the split angle compensator B when the first polarized light and the second polarized light originating from the second input light (of the second wavelength λ2) are input to the split angle compensator B The light outgoing plane (the fourth prism block B2) of the split angle compensator B has the following parameters.

$n_{B1P}$: The refractive index for the first polarized light of the first wavelength λ1

$n_{B1S}$: The refractive index for the second polarized light of the first wavelength λ1

$n_{B2P}$: The refractive index for the first polarized light of the second wavelength λ2

$n_{B2S}$: The refractive index for the second polarized light of the second wavelength λ2

L1: The separation distance between the first polarized light and the second polarized light originating from the first input light (of the first wavelength λ1) on the light outgoing plane of the split angle compensator B L2: The separation distance between the first polarized light and the second polarized light originating from the second input light (of the second wavelength λ2) on the light outgoing plane of the split angle compensator B The outgoing position compensator C has the following parameters.

$n_{C1}$: The refractive index at the first wavelength λ1

$n_{C2}$: The refractive index at the second wavelength λ2

D: The thickness (in the direction of the Z axis)

As described above, to cause the positions and directions of the outgoing light to coincide with each other, the refractive index $n_{B1P}$, the refractive index $n_{B2P}$, the separation distance L1, the separation distance L2, the refractive index $n_{C1}$, the refractive index $n_{C2}$, and the thickness D satisfy the following formulae.

$$L1-L2=D\cdot\tan\theta_{C22}-D\cdot\tan\theta_{C12}$$

$$n_{B1S}\cdot\sin\theta_{B12}=n_{C1}\cdot\sin\theta_{C12}$$

$$n_{B2S}\cdot\sin\theta_{B22}=n_{C2}\cdot\sin\theta_{C22}$$

The other parameters can be obtained by satisfying the same conditions as the case of the structures of FIGS. 3 and 4, but they can be obtained by round robin computation using a computer.

As described above, the deflected amounts (the split angles) of the light in the traveling directions in the polarizing beam splitter A depend on (1) an angle θ at which the junction plane between the first prism block A1 and the second prism block A2 is formed with the XY plane within the YZ plane, (2) materials (refractive indices) of the first and second prism blocks A1 and A2, and (3) directions of the optic axes of the first and second prism blocks A1 and A2.

Likewise, as described above, the deflected amounts (the split angles) of the light in the traveling directions in the split angle compensator B depend on (1) an angle θ' at which the junction plane between the third prism block B1 and the fourth prism block B2 is formed with the XY plane within the YZ plane, (2) materials (refractive indices) of the third and fourth prism blocks B1 and B2, and (3) directions of the optic axes of the third and fourth prism blocks B1 and B2.

FIGS. 11X, 11Y, 11B, and 11D are diagrams illustrating various blocks, each of which constitutes a prism.

In FIG. 11X, the YZ cross section is a triangular prism block, a light incoming plane $S1_{IN}$ is parallel to the XY plane, and a light outgoing plane (a junction plane) $S1_{OUT}$ joined with a prism of the next stage intersects the XY plane within the YZ cross section at an angle θ. An optic axis (a c axis) is parallel to the Z axis.

In FIG. 11Y, the YZ cross section is in a triangular shape, a light incoming plane $S1_{IN}$ is parallel to the XY plane, and a light outgoing plane (a junction plane) $S1_{OUT}$ joined with a prism of the next stage intersects the XY plane within the YZ cross section at an angle θ, but has an inclined angle inverse to the junction plane illustrated in FIG. 11X. An optic axis (a c axis) is parallel to the Z axis.

The block structures illustrated in FIGS. 11B and 11D are identical to those illustrated in the types (b) and (d) of FIGS. 5B and 5D, and thus description thereof will be omitted.

When the polarizing beam splitter A and the split angle compensator B, each of which is formed of a Rochon prism, are constituted of prism blocks, they are formed by attaching the prism block of FIG. 11X and the prism block of FIG. 11B on a junction plane or by attaching the prism block of FIG. 11Y and the prism block of FIG. 11D on a junction plane.

In the case of the structure illustrated in FIG. 9, the polarizing beam splitter A is formed by attaching the prism block of FIG. 11X and the prism block of FIG. 11B on the junction plane. Likewise, the split angle compensator B is formed by attaching the prism block of FIG. 11X and the prism block of FIG. 11B on the junction plane. In the case of this structure, the parameters of the refractive index, the material, and the angle formed by the junction plane and the XY plane of each block in the same way as the aforementioned relational formula also need only to be adjusted by a round bobbin analysis based on a computer such that outgoing directions and positions of beams coincide with each other. With regard to setting of the Rochon prism, the aforementioned prism blocks illustrated in FIGS. 11X, 11B, 11Y and 11D may be combined in various ways. In addition, the refractive indices are adjusted by embedding a metamaterial structure in the optical structure is also considered.

As described above, each of the polarizing beam splitter A and the split angle compensator B is formed of a Rochon prism. Since the Rochon prism can be easily available on the market, there is an advantage in that assembly is facilitated.

Figures 12A, 12B:
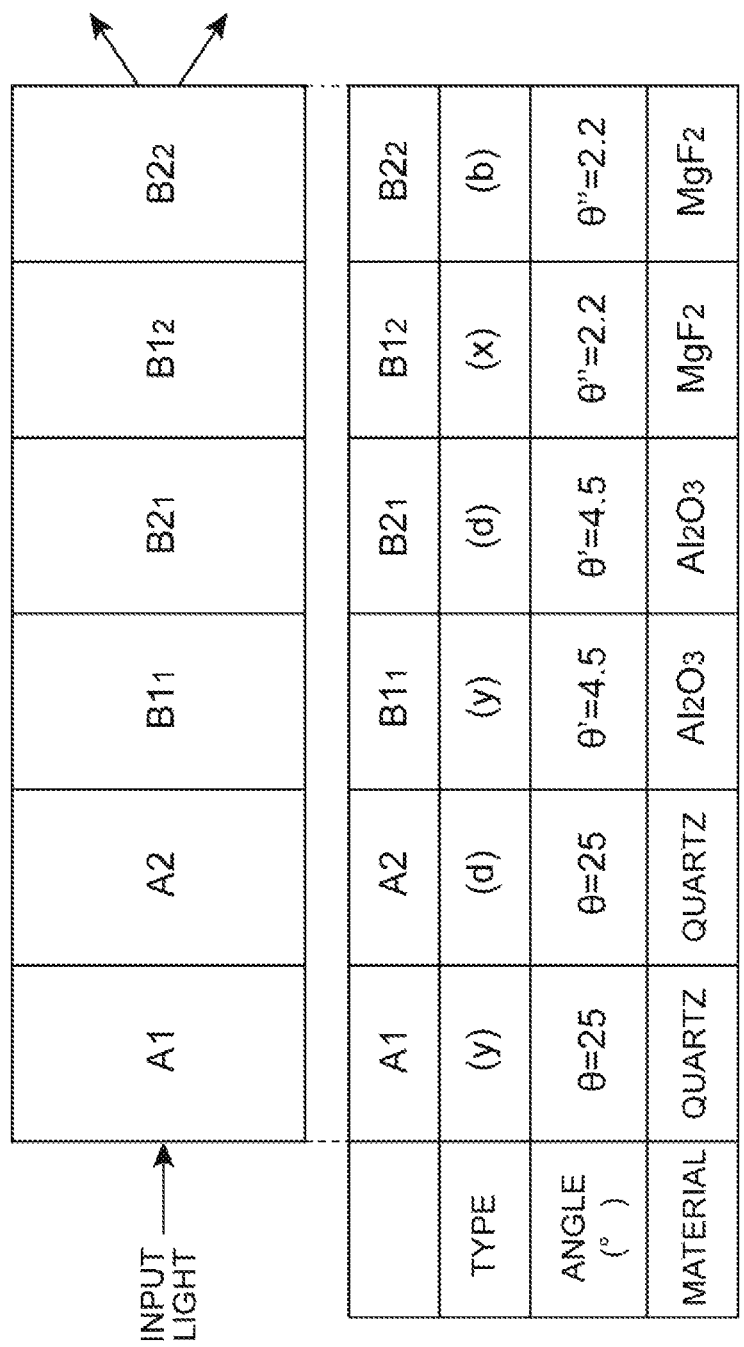
FIGS. 12A and 12B are diagrams for describing parameters of each block constituting the prism.

FIGS. 12A and 12B are diagrams for describing parameters of various blocks in an optical structure using another prism.

In the case of this structure, prism blocks of types (referred to as types (y), (d), (y), (d), (x), and (h) respectively) of FIG. 11Y, FIG. 11D, FIG. 11Y, FIG. 11D, FIG. 11X, and FIG. 11B are joined along the Z axis. A first prism block A1, a second prism block A2, a third prism block $B1_1$, a fourth prism block $B2_1$, a fifth prism block $B1_2$, and a sixth prism block $B2_2$ are lined up along the Z axis. This is to change a crystallographic orientation in the structures illustrated in FIG. 7 and FIGS. 8A and 8B. Even in this case, like the above case, outgoing positions and directions of finally emitted beams can be made nearly identical.

The structures of the types (b) and (d) of FIGS. 11B and 11D are identical to those of the types (b) and (d) described in FIGS. 5B, 5D and 8B, and thus description thereof will be omitted. The types (y) and (x) are as follows.

In the prism of the type (y) of FIG. 11Y which is represented on a chart of FIG. 12B, a light incoming plane $S1_{IN}$ of quartz is a (0001) plane, and a light outgoing plane $S1_{OUT}$ forms an angle θ (=25°) with respect to the light incoming plane $S1_{IN}$ within the YZ cross section, and is a plane perpendicular to the YZ plane. A light incoming plane S of $Al_2O_3$ of the type (y) of FIG. 5C is a (0001) plane, and a light outgoing plane $S1_{OUT}$ forms an angle θ (=θ'=4.5°) with respect to the light incoming plane $S1_{IN}$ within the YZ cross section, and is a plane perpendicular to the YZ plane.

In the prism of $MgF_2$ of the type (x) of FIG. 11X which is represented on the chart of FIG. 12B, a light incoming plane $S1_{IN}$ is a plane parallel to a (001) plane, and a light outgoing plane $S1_{OUT}$ forms an angle θ (=θ''=2.2°) with respect to the light incoming plane $S1_{IN}$ within the YZ cross section, and is a plane perpendicular to the YZ plane.

Figure 13:
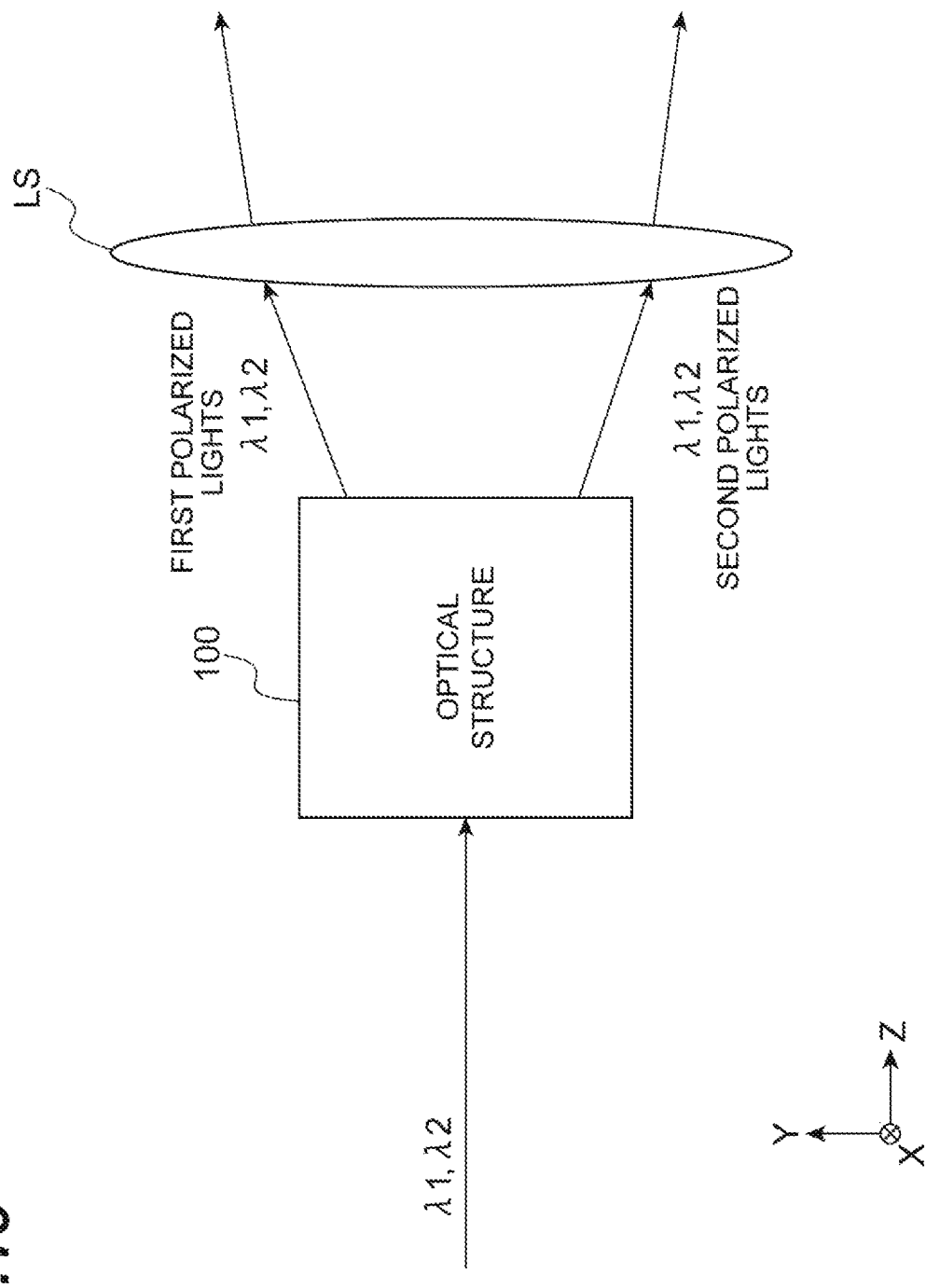
FIG. 13 is a diagram illustrating an optical structure to which a lens is added.

FIG. 13 is a diagram illustrating an optical structure to which a lens is added.

That is, a lens LS may be disposed at a rear stage of the aforementioned optical structure 100. The lens LS can change optical paths of the first polarized light and the second polarized light emitted from the optical structure 100.

The lens LS has the same refractive index or almost the same refractive index with respect to all wavelengths emitted from the optical structure. Lights split in the optical structure 100 pass through the lens LS, and are thereby emitted after being changed to the same split angle with respect to all of the wavelengths. Thereby, to change the split angle of a Wollaston prism, a plurality of Wollaston prisms or the like need not be made, and only the lens is replaced. Thereby, a wide range of split angle can be realized. For example, when the first wavelength λ1 and the second wavelength λ2 are 300 μm (1 THz) and 633 nm, cycloolefin polymer (COP) is suitable as a material of the lens.

Next, concrete simulation results of the optical structures using the Wollaston prisms illustrated in FIG. 7 and FIGS. 8A and 8B will be described.

When the optical structure 100 illustrated in FIG. 7 is used as an example, and the first input light and the second input light having different wavelengths λ1 and λ2 are coaxially incident on the polarizing beam splitter A along the Z axis, the first polarized light (λ1 and λ2) and the second polarized light (λ1 and λ2) are emitted from the outgoing position compensator C of the final stage at a split angle $\theta_{OUT}$, and are emitted on an image plane. The first wavelength λ1 is a terahertz wave (having a frequency of 1 THz to 2.4 THz and a wavelength of $300\times10^3$ to $125\times10^3$ nm), and the second wavelength is visible light (having a wavelength of 500 to 700 nm). A distance D from the light outgoing plane of the optical structure 100 to the image plane is 100 mm.

As a comparative example, the optical structure illustrated in FIG. 7 from which the outgoing position compensator C is removed is used, and final split angles $\theta_{OUT}$ of the first polarized light and the second polarized light and irradiation positions on the image planes of the split first polarized light and the split second polarized light in the direction of the Y axis were obtained.

FIG. 14 is a chart illustrating split angles at wavelengths and light irradiation positions on an image plane in examples and comparative examples.

As illustrated in the same figure, it is found that, in both of the example and the comparative example, the split angles nearly coincide with one another regardless of the wavelengths.

In the examples, a first polarized light irradiation position Y on the image plane is within a range of 0.29 mm or more and 0.316 mm or less, and a second polarized light irradiation position Y on the image plane is within a range of −0.28 mm or less and −0.310 mm or more. That is, the position of the first polarized light has a width of 0.026 mm on the image plane, and the position of the second polarized light has a width of 0.021 mm, but the outgoing positions of the output light coincide with each other within an error range. An upper side of a reference position on the image plane is set to a positive direction. The first polarized light is applied to a positive position, and the second polarized light is applied to a negative position.

Meanwhile, in the comparative examples, a first polarized light irradiation position Y on the image plane is within a range of 0.398 mm or more and 0.496 mm or less, and a second polarized light irradiation position Y on the image plane is within a range of −0.397 mm or less and −0.483 mm or more, and are found to be greatly shifted.

FIGS. 15A and 15B are graphs illustrating light irradiation positions on the image plane in the examples and the comparative examples.

In the same figures, a range of a data distribution of the light irradiation positions illustrated in FIGS. 15A and 15B is represented. The range of the data distribution of the light irradiation positions Y in the examples is small, and the range of the data distribution of the light irradiation positions Y in the comparative examples is great.

In this way, in comparison with the structures of the comparative examples, the structures of the examples are greatly improved in relation to coincidence of the light irradiation positions.

FIGS. 16A, 16B, 16C, and 16D are diagrams for describing an orientation of polarization.

In the polarizing beam splitter A and the split angle compensator B, a polarized state is adjusted.

FIGS. 16A to 16D are diagrams illustrating a polarized state on the light outgoing plane of the split angle compensator B after the light passes through the Wollaston prism in the structure of FIG. 7 using the Wollaston prism. In this example, linearly polarized light in a direction inclined from the horizon at an angle of 45° is vertically incident on a single Wollaston prism. The linearly polarized light in a vertical direction is indicated by a longitudinal line in the vertical direction, and the linearly polarized light in a horizontal direction is indicated by a transverse line in the horizontal direction. FIGS. 16A and 16C show upwardly split polarization components, and FIGS. 16B and 16D show downwardly split polarization components. FIGS. 16A and 16B show a pattern when the outgoing position compensator C is used, and FIGS. 16C and 16D show a pattern when the outgoing position compensator C is not used. However, the orientation of polarization is not greatly changed.

As illustrated in FIGS. 8A and 8B, when the material of the polarizing beam splitter A is quartz, when the material of the split angle compensator B is sapphire ($Al_2O_3$) and $MgF_2$, and when the material of the outgoing position compensator C is sapphire, it is found that an upwardly split beam has only a horizontal linear polarization component and that a downwardly split beam has only a vertical linear polarization component. The cases of FIGS. 16C and 16D in which the outgoing position compensator C is not used are also the same. In any case, it was confirmed that the linearly polarized light is not changed by circularly polarized light or a change in the direction of polarization, and are subjected to polarization split.

As described above, the optical structure can cause each of the traveling directions and the outgoing positions of the different wavelengths to coincide with each other. As the wavelengths, wavelengths other than the above wavelengths may be used. For example, visible light of 633 nm may be used as the visible light. The optical structure may be at least applied to a wavelength of 500 nm to 700 nm of the visible light, and a frequency of about 0.5 to 5 THz of the terahertz wave.

The crystalline material of the Wollaston prism or the Rochon prism needs to be a uniaxial or biaxial crystal, but quartz, $MgF_2$, KDP, KTP, $LiNbO_3$, $LiTaO_3$, $KNbO_3$, sapphire, LBO, CLBO, $AgGaS_2$, $AgGaSe_2$, ZGP, GaN, BBO, $TiO_2$, calcite, polycarbonate, or the like may be used.

The crystalline material of the outgoing position compensator C is not limited to the uniaxial and biaxial crystals, and may be amorphous in addition to other crystals having an isotropic characteristic or the like, and quartz, sapphire, $MgF_2$, KDP, KTP, $LiNbO_3$, $LiTaO_3$, $KNbO_3$, LBO, CLBO, $AgGaS_2$, $AgGaSe_2$, ZGP, GaN, BBO, $TiO_2$, calcite, acrylic, cycloolefin polymer, polycarbonate, silicon, germanium, MgO, or the like may be used.

The number of different wavelengths may be more than or equal to two.

The junction plane of each of the aforementioned element may be adhered using a proper adhesive.

According to the optical structure described above, each of the optical paths and the outgoing positions in the polarizing element such as a Wollaston prism having different refractive indices at two or more discontinuous wavelength bands can be caused to coincide with each other between the lights of the different wavelength bands. Thereby, for example, the propagation path of the terahertz wave that is invisible can be checked by the visible light, and the adjustment of the optic axis or the like is facilitated. The optical structure can be applied to various devices such as a security inspection device or a terahertz wave differential interference imaging, and so on.

As the polarizing beam splitter performing the polarization split, a Savart plate, a polarization beam displacer, a Nomarski prism, or the like may be applied.

As described above, the alignment compensator 10 causes the traveling directions and the outgoing positions of the first polarized light and the second polarized light, which are different in wavelength and are output from the front polarizing beam splitter A, to coincide with each other. As the structure of the alignment compensator 10, as prescribed above, a structure in which the split angles of the different wavelengths are first approximated by the split angle compensator B and, at the rear stage of the split angle compensator B, the outgoing positions are caused to coincide with each other with respect to the first polarized light and the second polarized light, for example, by the outgoing position compensator having an isotropic refractive index distribution may be used. In the case of this structure, since the parameters can be independently controlled, there is an advantage in which a design is facilitated.

What is claimed is:

1. An optical structure comprising:
a polarizing beam splitter which splits input light input from an incoming plane thereof into first polarized light and second polarized light and in which a split angle, which is an angle formed by traveling directions of the first polarized light and the second polarized light, is an acute angle; and
an alignment compensator which is disposed at a rear stage of the polarizing beam splitter and outputs the input first polarized light and the input second polarized light from a light outgoing plane thereof,
wherein, when a first input light having a first wavelength ($\lambda 1$) is input to the polarizing beam splitter, and when a second input light having a second wavelength ($\lambda 2$) is input to the polarizing beam splitter, the alignment compensator
causes each of traveling directions and outgoing positions of the first polarized light of the first input light and the first polarized light of the second input light to coincide with each other on the light outgoing plane of the alignment compensator, and
causes each of traveling directions and outgoing positions of the second polarized light of the first input light and the second polarized light of the second input light to coincide with each other on the light outgoing plane of the alignment compensator,
wherein the alignment compensator comprises
a split angle compensator; and
an outgoing position compensator,
the split angle compensator satisfies $\theta 2-\theta 1 > \theta 2'-\theta 1'$, when the split angle for the first input light input to the polarizing beam splitter is set to $\theta 1$,
when the split angle for the second input light input to the polarizing beam splitter is set to $\theta 2$,
when the split angle in the split angle compensator when the first polarized light and the second polarized light originating from the first input light are input to the split angle compensator is set to $\theta 1'$,
when the split angle in the split angle compensator when the first polarized light and the second polarized light originating from the second input light are input to the split angle compensator is set to $\theta 2'$,
when $\lambda 1 > \lambda 2$, and
when $\theta 1 > \theta 2$,
a light outgoing plane of the split angle compensator has a refractive index ($n_{B1P}$) for the first polarized light of the first wavelength ($\lambda 1$),
a refractive index ($n_{B1S}$) for the second polarized light of the first wavelength ($\lambda 1$),
a refractive index ($n_{B2P}$) for the first polarized light of the second wavelength ($\lambda 2$), and
a refractive index ($n_{B2S}$) for the second polarized light of the second wavelength ($\lambda 2$),
when a separation distance between the first polarized light and the second polarized light originating from the first input light on the light outgoing plane of the split angle compensator is set to L1, and
when a separation distance between the first polarized light and the second polarized light originating from the second input light on the light outgoing plane of the split angle compensator is set to L2,
the outgoing position compensator has
a refractive index ($n_{C1}$) at the first wavelength ($\lambda 1$),
a refractive index ($n_{C2}$) at the second wavelength ($\lambda 2$), and
a thickness (D),
the refractive index ($n_{B1S}$), the refractive index ($n_{B1P}$), refractive index ($n_{B2S}$), the refractive index ($n_{B2P}$), the separation distance (L1), the separation distance (L2), the refractive index ($n_{C1}$), the refractive index ($n_{C2}$), and the thickness (D) satisfy relational formulae below:

$L1-L2=(D \cdot \tan \theta_{C21}-D \cdot \tan \theta_{C11})+(D \cdot \tan \theta_{C22}-D \cdot \tan \theta_{C12})$, $\theta_{C11}=\sin^{-1}((n_{B1P} \cdot \sin \theta_{B11})/n_{C1})$, $\theta_{C21}=\sin^{-1}((n_{B2P} \cdot \sin \theta_{B21})/n_{C2})$, $\theta_{C22}=\sin^{-1}((n_{B1S} \cdot \sin \theta_{B12})/n_{C1})$, and $\theta_{C12}=\sin^{-1}((n_{B2S} \cdot \sin \theta_{B22})/n_{C2})$.

2. The optical structure according to claim 1, wherein each of the polarizing beam splitter and the split angle compensator is formed of a Wollaston prism.

3. The optical structure according to claim 2, wherein:
the polarizing beam splitter is made up of a first Wollaston prism obtained by attaching two trigonal crystal blocks such that c axes are orthogonal to each other;
the split angle compensator is made up of a second Wollaston prism obtained by attaching two trigonal crystal blocks such that c axes are orthogonal to each other and a third Wollaston prism that is disposed at a rear stage of the second Wollaston prism and is obtained by attaching two tetragonal crystal blocks such that c axes are orthogonal to each other; and
the c axes of the first, second, and third Wollaston prisms are all orthogonal to the traveling direction of the input light into the polarizing beam splitter.

4. The optical structure according to claim 1, wherein each of the polarizing beam splitter and the split angle compensator is formed of a Rochon prism.

5. The optical structure according to claim 3, wherein:
the trigonal crystal block is formed of quartz or sapphire; and
the tetragonal crystal block is formed of $MgF_2$.

* * * * *